US010379007B2

(12) United States Patent
Perrone et al.

(10) Patent No.: US 10,379,007 B2
(45) Date of Patent: Aug. 13, 2019

(54) AUTOMATED ROBOTIC TEST SYSTEM FOR AUTOMATED DRIVING SYSTEMS

(71) Applicant: Perrone Robotics, Inc., Charlottesville, VA (US)

(72) Inventors: Paul J. Perrone, Crozet, VA (US); Nick Mykris, Charlottesville, VA (US); Boris Ciorneiu, Great Falls, VA (US); Michael Desrosiers, Charlottesville, VA (US); Don Perrone, Crozet, VA (US)

(73) Assignee: Perrone Robotics, Inc., Charlottesville, VA (US)

( * ) Notice: Subject to any disclaimer, the term of this patent is extended or adjusted under 35 U.S.C. 154(b) by 0 days.

(21) Appl. No.: 15/192,609

(22) Filed: Jun. 24, 2016

(65) Prior Publication Data
US 2016/0377508 A1    Dec. 29, 2016

Related U.S. Application Data

(60) Provisional application No. 62/184,104, filed on Jun. 24, 2015.

(51) Int. Cl.
G01M 17/007    (2006.01)
G01M 17/06    (2006.01)
(Continued)

(52) U.S. Cl.
CPC ............ *G01M 17/06* (2013.01); *B60W 10/04* (2013.01); *B60W 10/184* (2013.01);
(Continued)

(58) Field of Classification Search
CPC .... G01M 17/06; G01M 17/007; B60W 10/04; B60W 10/184; B60W 10/20; B60W 30/18181; B60W 2600/00
(Continued)

(56) References Cited

U.S. PATENT DOCUMENTS 4,586,151 A    4/1986    Buote
4,689,755 A    8/1987    Buote
(Continued)

FOREIGN PATENT DOCUMENTS

JP    H02-182688 A    7/1990
JP    2003-145462 A    5/2003
(Continued)

OTHER PUBLICATIONS

Montemerlo et al., "Perspectives on Standardization in Mobile Robot Programming: the Carnegie Mellon Navigation (CARMEN) Toolkit", *Proceedings of the IEEE/RSJ International Conference on Intelligent Robots and Systems* (2003); 6 pages.
(Continued)

*Primary Examiner* — John D Walters
(74) *Attorney, Agent, or Firm* — Sterne, Kessler, Goldstein & Fox P.L.L.C.

(57) ABSTRACT

An integrated automated robotic test system for automated driving systems is disclosed, which is operable to provide an automated testing system for coordinated robotic control of automobiles equipped with automation functions (i.e., test vehicles) and unmanned target robots with which test vehicles may safely collide. The system may include a system for controlling a vehicle that includes a brake actuator, a throttle actuator, and a steering actuator. The brake actuator is controlled by a brake motor and configured to press and release a brake pedal of the vehicle. The throttle actuator is controlled by a throttle motor and configured to press and release a gas pedal of the vehicle. The steering actuator is configured to control a steering wheel of the vehicle. The steering actuator includes a steering motor configured to attach to the steering wheel and a reaction stand configured to support the steering motor.

20 Claims, 34 Drawing Sheets

(51) Int. Cl.
  *B60W 30/18*   (2012.01)
  *B60W 10/04*   (2006.01)
  *B60W 10/184*  (2012.01)
  *B60W 10/20*   (2006.01)

(52) U.S. Cl.
  CPC ...... *B60W 10/20* (2013.01); *B60W 30/18181* (2013.01); *G01M 17/007* (2013.01); *B60W 2600/00* (2013.01)

(58) Field of Classification Search
  USPC .......................................................... 180/167
  See application file for complete search history.

(56) References Cited

U.S. PATENT DOCUMENTS

| | | | |
|---|---|---|---|
| 4,730,258 A | 3/1988 | Takeda et al. | |
| 4,803,613 A | 2/1989 | Kametani et al. | |
| 4,974,191 A | 11/1990 | Amirghodsi et al. | |
| 5,124,918 A | 6/1992 | Beer et al. | |
| 5,655,148 A | 8/1997 | Richman et al. | |
| 5,696,970 A | 12/1997 | Sandage | |
| 5,748,980 A | 5/1998 | Lipe et al. | |
| 5,825,981 A | 10/1998 | Matsuda | |
| 5,999,989 A | 12/1999 | Patel | |
| 6,078,747 A | 6/2000 | Jewitt | |
| 6,175,206 B1 | 1/2001 | Ueno et al. | |
| 6,226,692 B1 | 5/2001 | Miloushev et al. | |
| 6,259,980 B1 * | 7/2001 | Peck | B60T 7/12 701/24 |
| 6,266,577 B1 | 7/2001 | Popp et al. | |
| 6,405,099 B1 | 6/2002 | Nagai et al. | |
| 6,442,451 B1 | 7/2002 | Lapham | |
| 6,513,058 B2 | 1/2003 | Brown et al. | |
| 6,636,781 B1 | 10/2003 | Shen et al. | |
| 6,658,325 B2 | 12/2003 | Zweig | |
| 6,671,582 B1 | 12/2003 | Hanley | |
| 6,675,070 B2 | 1/2004 | Lapham | |
| 6,804,580 B1 | 10/2004 | Stoddard et al. | |
| 6,889,118 B2 | 5/2005 | Murray et al. | |
| 6,922,611 B2 | 7/2005 | Lapham | |
| 6,931,546 B1 | 8/2005 | Kouznetsov et al. | |
| 6,938,111 B2 | 8/2005 | Herberth | |
| 7,024,666 B1 | 4/2006 | Brown | |
| 7,031,798 B2 | 4/2006 | Brown et al. | |
| 7,065,638 B1 | 6/2006 | Chlytchkov | |
| 7,137,107 B1 | 11/2006 | Brown | |
| 7,139,843 B1 | 11/2006 | Brown et al. | |
| 7,529,599 B1 | 5/2009 | Bhatt et al. | |
| 7,558,646 B2 | 7/2009 | Matsumoto et al. | |
| 7,801,644 B2 | 9/2010 | Bruemmer et al. | |
| 7,974,738 B2 | 7/2011 | Bruemmer et al. | |
| 8,255,093 B2 * | 8/2012 | Layton | G05D 1/0038 701/2 |
| 8,428,864 B2 | 4/2013 | Kelly et al. | |
| 8,447,509 B2 | 5/2013 | Kelly et al. | |
| 8,589,602 B2 | 11/2013 | Bond et al. | |
| 8,972,053 B2 | 3/2015 | Bruemmer et al. | |
| 9,195,233 B2 | 11/2015 | Perrone | |
| 9,269,087 B2 | 2/2016 | Salvaggio | |
| 9,384,327 B2 | 7/2016 | Snyder et al. | |
| 9,844,880 B1 * | 12/2017 | Takach | B25J 9/1679 |
| 2003/0090018 A1 | 5/2003 | Bulgrin | |
| 2005/0182518 A1 | 8/2005 | Karlsson | |
| 2009/0082879 A1 | 3/2009 | Dooley et al. | |
| 2011/0224828 A1 | 9/2011 | Breznak et al. | |
| 2011/0270783 A1 | 11/2011 | Burton | |
| 2016/0221186 A1 | 8/2016 | Perrone | |

FOREIGN PATENT DOCUMENTS

| | | |
|---|---|---|
| WO | WO 2005/103848 A1 | 11/2005 |
| WO | WO 2005/109299 A1 | 11/2005 |
| WO | WO 2007/041390 A2 | 4/2007 |

OTHER PUBLICATIONS

Munich et al., "ERSP: A Software Platform and Architecture for the Service Robotics Industry", Proc. of the Int. Conf. on Intelligent Robots and Systems (IROS) (2005); 8 pages.

Utz et al., "Miro—Middleware for Mobile Robot Applications", *IEEE Transactions on Robotics and Automation*, IEEE Inc. NY., XP011079552, pp. 493-495 (Aug. 2002); 5 pages.

Communication Pursuant to Article 94(3) EPC for European Patent Application No. 07 751 652.4, dated May 5, 2011; 10 pages.

Extended European Search Report for European Patent Application No. 07 751 652.4; dated Mar. 9, 2010; 14 pages.

Second communication Pursuant to Article 94(3) EPC for European Patent Application No. 07 751 652.4; dated Nov. 24, 2011; 5 pages.

"Evolution Robotics: ERSP Architecture"; found at www.evolution.com/products/ersp/architecture.masn; last accessed Mar. 22, 2012; 2 pages.

"Interfaces (C# Programming Guide)", available at msdn.microsoft.com/en-us/library/ms173156.aspx, last accessed Mar. 15, 2017; 4 pages.

Seyfarth et al., "Open System Architecture for Controls within Automation Systems (OSACA)", The Industrial Information Technology Handbook, CRC Press LLC (2005); 11 pages.

Bruyninckx, "OROCOS: design and implementation of a robot control software framework", http://www.orocos.org (Apr. 2002); 9 pages.

Duran-Limon, "A Resource Management Framework for Reflective Multimedia Middleware", Computing Department Lancaster University, UK (Oct. 2001); 233 pages.

Sanjeepan, "A Service-Oriented, Scalable, Secure Framework for Grid-Enabling Legacy Scientific Applications", University of Florida (2005); 96 pages.

Bruyninckx, "Open Robot Control Software: the OROCOS project", Proceedings of the 2001 IEEE International Conference on Robotics & Automation, 0/7803-6475-9/01, pp. 2523-2528 (May 2001); 6 pages.

Bruyninckx et al., "The Real-Time Motion Control Core of the Orocos project", Proceedings of the 2003 IEEE International Conference on Robotics & Automation, 0-7803-7736-2/03, pp. 2766-2771 (Oct. 2003); 6 pages.

Le Charlier et al., "Experimental Evaluation of a Generic Abstract Interpretation Algorithm for PROLOG", ACM Transactions on Programming Languages and Systems, vol. 16, No. 1, pp. 35-101 (Jan. 1, 1994); 67 pages.

S. Kagami et al., "Design of real time large scale robot software platform and its implementation in the remote brained robot project", 1996, proc. IROS 96, IEEE, 0-7803-3213-X/96, pp. 1394-1399.

OROCOS.org, What is Orocos project, the Orocos real-time toolkit, no date, Internet, last accessed Jun. 1, 2009; 8 pages.

Knight, "The Future of Autonomy", Inside Unmanned Systems (2015), available at http://insideunmannedsystems.com/future-autonomy; 7 pages.

"Safety Testing at IIHS", Perrone Robotics Inc. (May 15, 2014), available at http://www.perronerobotics.com/news/2014/5/15/safety-testing-at-iihs; 6 pages.

Evolution Robotics, Inc., "ERSP 3.0 Robotic Development Platform User's Guide", Evolution Robotics, Inc., 130 West Union Street, Pasadena, CA 91103 (2001); 177 pages.

"The Java™ Tutorials", Oracle Inc. (1995), last accessed Apr. 11, 2017, found at http://docs.oracle.com/javase/tutorial/java/IandI/createinterface.html; 2 pages.

"Interface Naming Guidelines", Microsoft Corporation (2012), last accessed Apr. 11, 2017, found at http://msdn.microsoft.com/en-us/library/8bc1fexb(v=vs.71).aspx; 2 pages.

Perrone, et al., "J2EE Developer's Handbook", Ch. 23, pp. 1051-1082 (2003); 33 pages.

"Technical Standard: Service-Oriented Architecture Ontology", The Open Group, Berkshire, UK (Oct. 2010); 90 pages.

(56) References Cited

OTHER PUBLICATIONS

Evolution Robotics, Inc., "ERSP 3.0 Robotic Development Platform API Documentation", Evolution Robotics, Inc., 130 West Union Street, Pasadena, CA 91103, 2001.

* cited by examiner

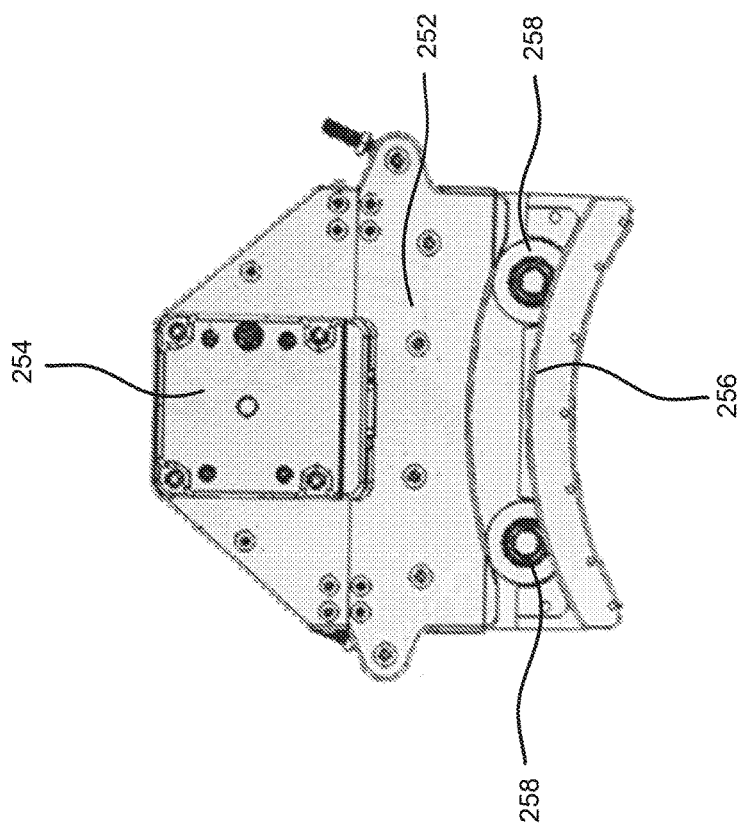

AUTOMATED ROBOTIC TEST SYSTEM FOR AUTOMATED DRIVING SYSTEMS

CROSS-REFERENCE TO RELATED APPLICATIONS

This application claims priority to U.S. Provisional Application No. 62/184,104, filed on Jun. 24, 2015, which is incorporated herein by reference in its entirety.

BACKGROUND OF THE INVENTION

Field of the Invention

This disclosure relates generally to automated robotic test systems, and more specifically, to automated robotic test systems for automated driving systems.

Background Art

Vehicles may be equipped with hardware and/or software that provide automated driving functions (e.g., advanced driver assistance systems, collision avoidance technology, etc.). These automated vehicles may be sold commercially or may be used in a test setting. For example, automated vehicles may be used to test the automated driving functions to ensure their safety and effectiveness. Improved systems for testing automated driving functions are desirable.

BRIEF DESCRIPTION OF THE DRAWINGS/FIGURES

The accompanying drawings, which are incorporated herein and form a part of the specification, illustrate the present invention and, together with the description, further serve to explain the principles of the invention and to enable a person skilled in the pertinent art to make and use the invention.

FIG. 34 shows a bottom view of a steering motor of a drop-in actuation kit according to some embodiments.

DETAILED DESCRIPTION OF THE INVENTION

Figure 1:
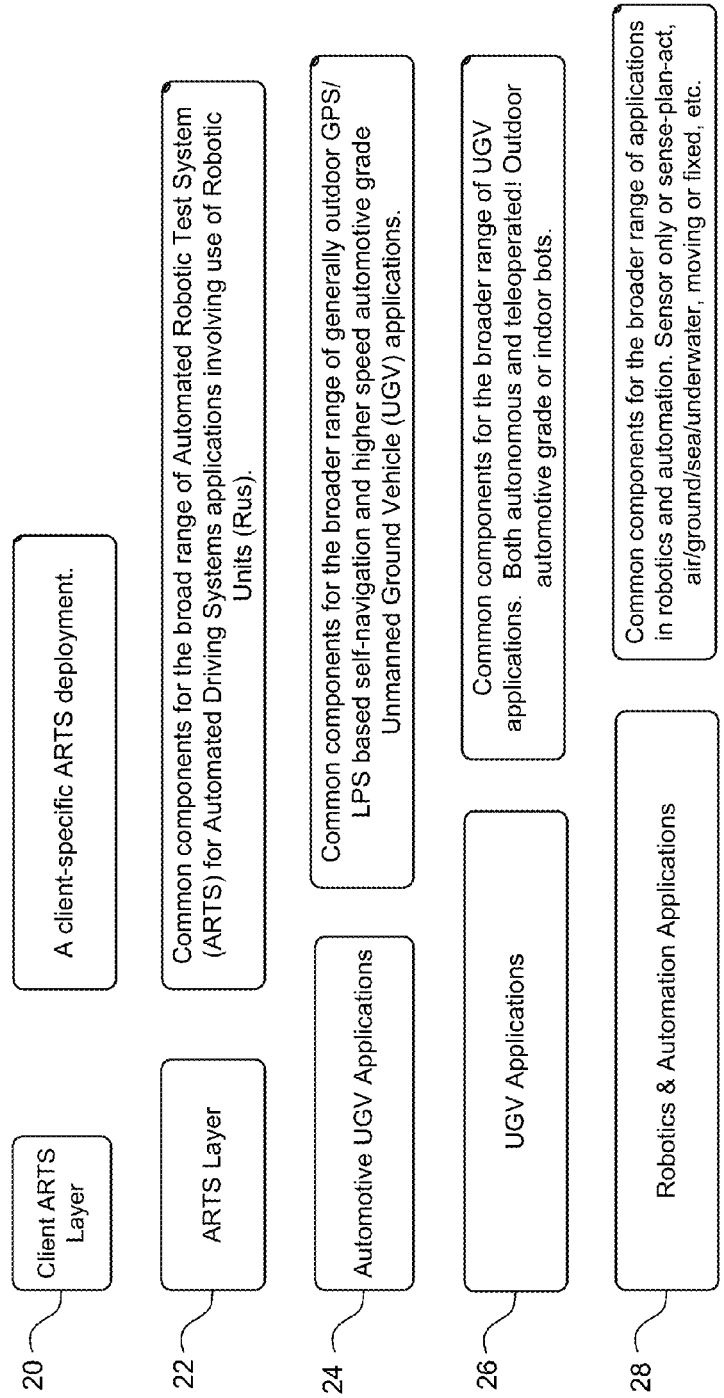
FIG. 1 shows a diagram of common software architecture according to some embodiments.

The present invention will now be described in detail with reference to embodiments thereof as illustrated in the accompanying drawings, in which like reference numerals are used to indicate identical or functionally similar elements. References to "one embodiment," "an embodiment," "an example embodiment," etc., indicate that the embodiment described may include a particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

The term "invention" or "present invention" as used herein is a non-limiting term and is not intended to refer to any single embodiment of the particular invention but encompasses all possible embodiments as described in the application.

The following examples are illustrative, but not limiting, of the present invention. Other suitable modifications and adaptations of the variety of conditions and parameters normally encountered in the field, and which would be apparent to those skilled in the art, are within the spirit and scope of the invention.

Introduction

Provided herein are system, method and/or computer program product embodiments, and/or combinations and sub-combinations thereof, for an integrated automated robotic test system for automated driving systems ("ARTS"). The ARTS is operable to provide an automated testing system for coordinated robotic control of automobiles equipped with automation functions (i.e., test vehicles) and unmanned target robots with which test vehicles may safely collide.

In some embodiments, the automation functions in automotive vehicles under test may include advanced driver assistance systems ("ADAS"), collision avoidance technology, partially automated driving functions, or fully automated driving functions. These functions are collectively referred to here as automated driving functions. Vehicles which have these functions are referred to as automated vehicles. In the context of ARTS, these automated vehicles are also referred to as test vehicles.

Each of the robotically controlled test vehicles and target robots are individually referred to as a robotic unit ("RU") in this application. An RU may thus refer to either a robotically controlled test vehicle or a target robot.

Local & Global Positioning Systems

In some embodiments, the ARTS system leverages a positioning system to sense and provide positions for RUs. The positions for an RU may be referenced in terms of any coordinate system. For example, this coordinate system may refer to positions in some X, Y, Z frame of reference or in terms of latitude, longitude, and altitude as is common in the Global Positioning System ("GPS") frame of reference, or using any other well-known coordinate and/or positioning system(s).

In some embodiments, Commercial Off The Shelf ("COTS") GPS sensors may be used to equip RUs. These GPS sensors may provide different levels of precision based on their architecture and design. These architectures may include, among others, stand-alone GPS sensor to satellite communications, connection with differential GPS ("DGPS") signals, and connection with Real Time Kinematic ("RTK") base station corrections.

In some embodiments, a Local Positioning System ("LPS") may also be uniquely leveraged here and combined to provide ARTS with a positioning solution. LPS is a positioning technology that creates a local ground-based replica of GPS-style positioning. Instead of using orbiting satellites, LPS utilizes a network of small, ground-based transmitters that blanket a chosen area with radio-positioning signals. Because it is terrestrially based and provides powerful signals, LPS can work in any internal or external environment. An example incarnation of an LPS leveraged by ARTS is an LPS from. Locata Corporation. Locata's LPS is uniquely combined with ARTS to provide a local positioning system for control of robotic vehicles. And even more uniquely combined for control of robotic vehicles used in automated vehicle testing.

The positioning resolution of an LPS may be increased by selection of an increasing number of local positioning transmitters. Thus, the positioning accuracy of an ARTS deployment may be tailored based on the number of local positioning transmitters utilized.

Communications Systems

In some embodiments, ARTS leverages a communication system ("COMS") for messaging among RUs, wayside devices, handheld devices, human machine interfaces ("HMIs"), and centralized computing platforms. The COMS includes one or more of the following:

One or more proprietary RF networks ("PRF").
One or more standard wireless networks (e.g., standard WiFi).
One or more Emergency Stop ("E-Stop") networks.
One or more point-to-point networks ("PTP").

ARTS system messages may flow redundantly across multiple networks. The performance and priority levels of these are defined as follows:

E-Stop-Critical: Message priority critical in the functioning of E-Stop capability.
Mission-Critical: Message priority critical for RU-to-RU coordination of movements (position, heading, speeds, accelerations).
High-Priority: Message priority above Normal Priority messages but less critical than Mission Critical Priority messages.
Normal-Priority: Message priority for standard system messages such (e.g., HMI and data logging).

The ARTS COMS can support multiple communications networks. In some embodiments, the COMS provides a dedicated E-Stop communications network reserved only for E-Stop messages. In some embodiments, the COMS also provides a zero hand-off latency communications network for RU to RU communications. This may be effectively achieved with a PRF network which only involves a single access point for a wide area of test coverage. Mission-Critical messages are all suited for this network. In some embodiments, redundant E-Stop messages may also flow over this network.

The COMS may also provide a dedicated high-speed communications network over standard WiFi. In some embodiments, this dedicated network is isolated from more global standard WiFi traffic and offers a suitable environment for redundant Mission-Critical and E-Stop messages. Furthermore, High-Priority messages may flow over this network. In some embodiments, the COMS may also provide a shared high-speed communications network most suitable for Normal Priority messages (e.g. HMI traffic), and for redundant High-Priority, E-Stop Critical, and Mission-Critical messages.

The COMS may also optionally provide a Peer-to-Peer ("P2P") communications network for short range Mission Critical messaging.

In some embodiments, the COMS is designed to operate over a spectrum of non-interfering frequencies among the various networks. This may include operating the networks on different frequencies as well as maintaining proper separation distances of antennas containing competing frequencies.

The COMS may embody a number of communication protocols inclusive of TCP/IP, UDP, ZigBee, HTTP, and others.

The ARTS COMS thus allows for a flexible and modular network architecture approach to facilitate communications among nodes on the network (e.g., RUs, HMIs, servers, devices) which participate in the ARTS system, to communicate messages at varying levels of priority, redundantly, and with different latency and delivery demands. The demands and performance of a particular ARTS deployment may thus be tailored with this flexible network architecture.

Common Robotic Unit (RU) Hardware & Software

In some embodiments, ARTS is operable to provide a general purpose robotics architecture for RUs that participate in ARTS. Common components, hardware and software, are utilized across RU types. For example, ARTS equipped test vehicles may leverage the same positioning sensor or movement planning software as an ARTS target robot. This commonality of reuse offers integration advantages for increased performance and user (i.e., client) experiences. Moreover, in some embodiments, underlying layers of ARTS software may provide further generality across application domains as ARTS may be built atop of a general purpose robotics software platform ("GPRSP") such as that described in U.S. patent application Ser. No. 11/361,974, filed Feb. 27, 2006, now U.S. Pat. No. 9,195,233, which is herein incorporated by reference in its entirety. However, such embodiments are not limited to this general purpose robotics software platform.

For example, FIG. 1 depicts a diagram of the ARTS common software architecture 101 built atop of other GPRSP software layers, according to an example embodiment. In some embodiments, any client-specific customizations and tailoring comprise a top layer 20 (e.g., client ARTS layer 20) of the software architecture 101. In some embodiments, below client ARTS layer 20 is an ARTS layer 22 embodying common software across ARTS RUs (e.g., ARTS test planning). Below that, in some embodiments, is the GPRSP automotive unmanned ground vehicle ("UGV") applications layer 24 embodying common software across UGV applications involving automobiles (e.g., brake and throttle controls). Below that, in some embodiments, is the GPRSP UGV applications layer 26 embodying common software across UGVs of any ilk, including indoor and outdoor UGVs (e.g., position-based self navigation). Below that, in some embodiments, is the GPRSP common platform layer 28 (e.g., Robotics & Automation Applications layer 28) embodying common software across robotics and automation applications (e.g., sensor message parsing). Thus, GPRSP common platform layer 28, UGV applications layer 26, and Automotive UGV applications layer 24 is the GPRSP platform. Common ARTS software rests atop this GPRSP platform in ARTS layer 22, as well as client-specific software in client ARTS layer 20.

Common Robotic Unit (RU) Instrumentation & Controls

In some embodiments, there are common instrumentation and controls for ARTS RUs. In general, common instrumentation and controls are embedded in the RUs (e.g., inside the onboard controllers). These are distinguished from the human level controls exposed via the HMIs. RUs include robotically equipped test vehicles and target robots.

Figure 2:
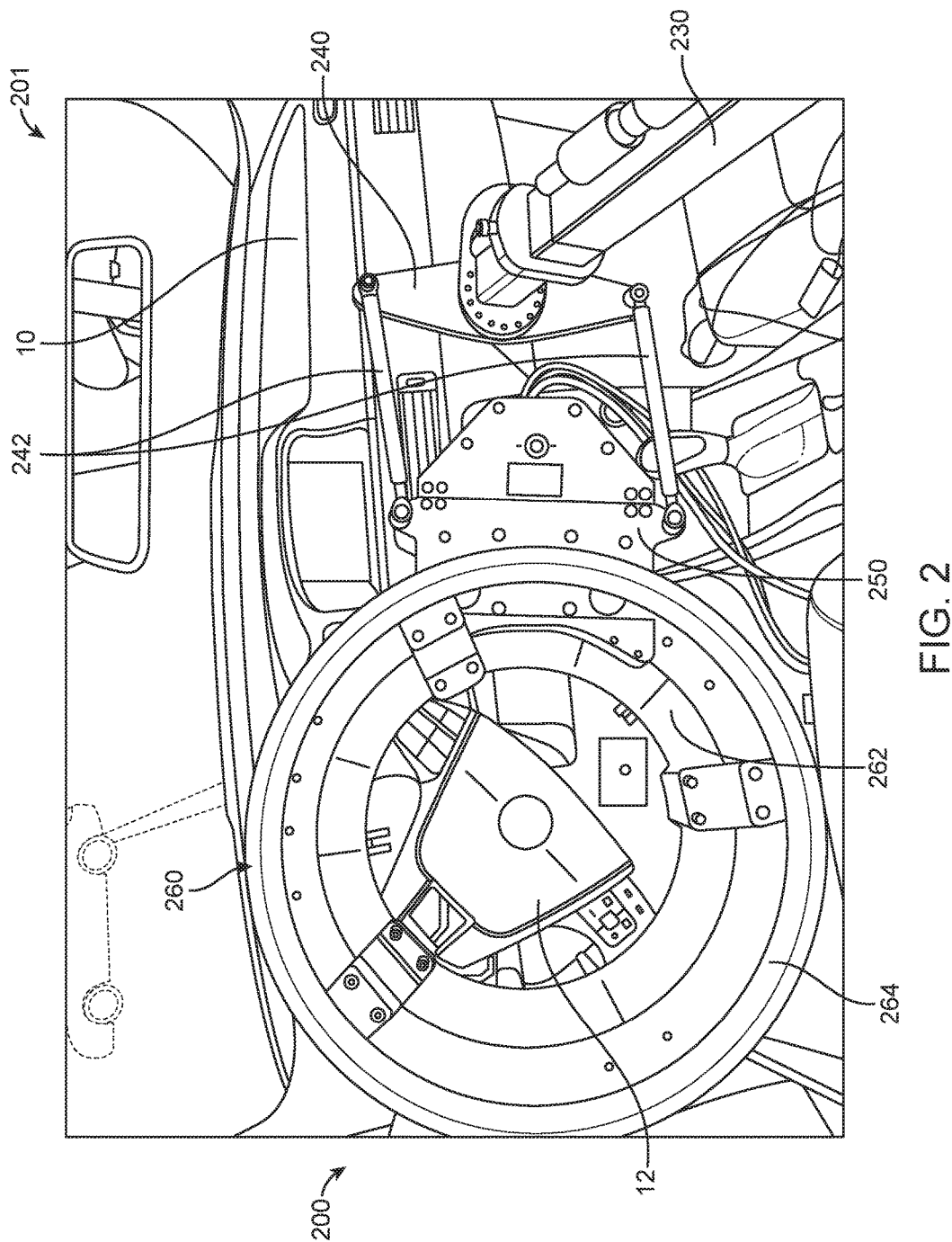
FIG. 2 shows a portion of a drop-in actuation kit installed in a vehicle according to some embodiments.
Figure 3:
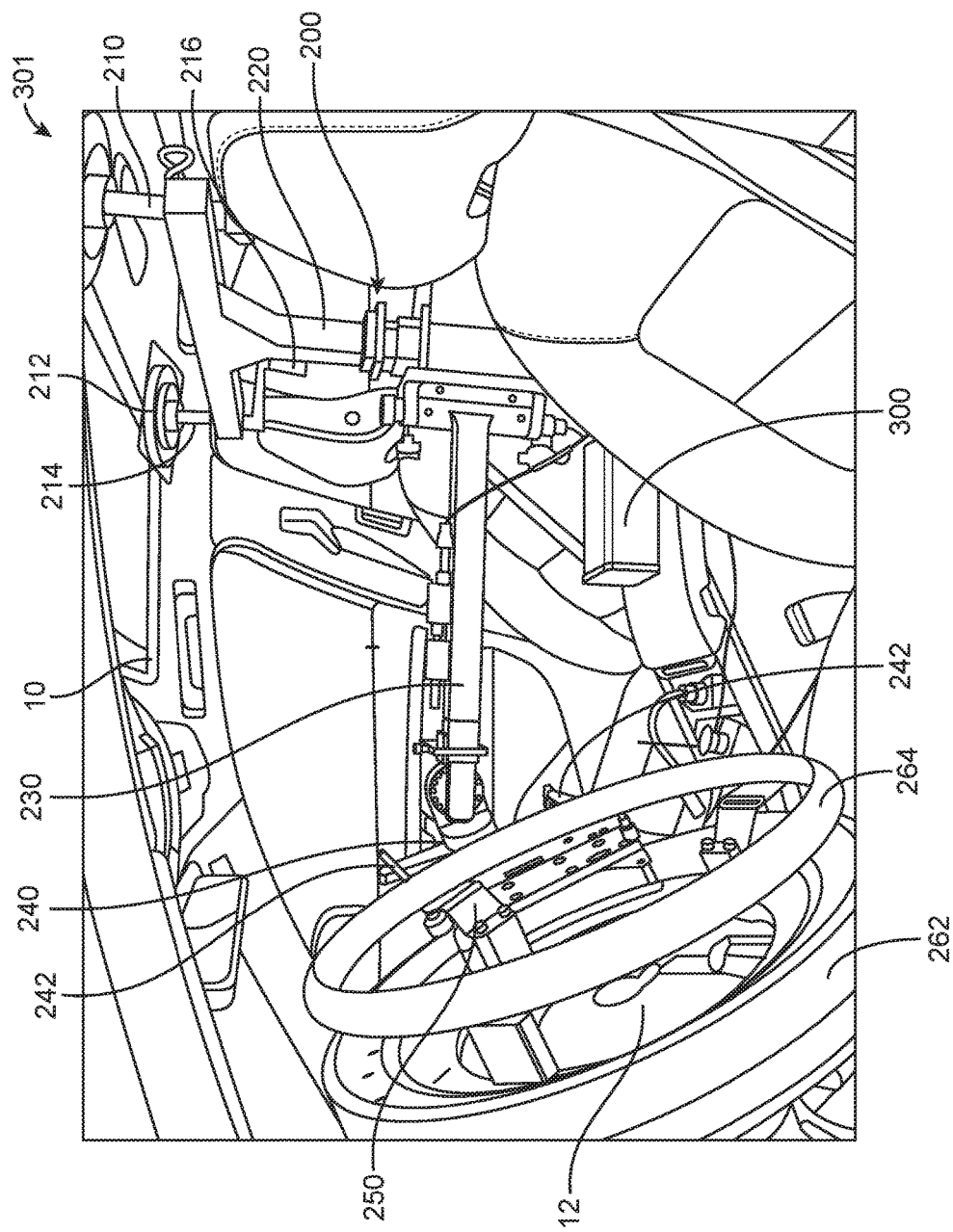
FIG. 3 shows a portion of a drop-in actuation kit installed in a vehicle according to some embodiments.
Figure 4:
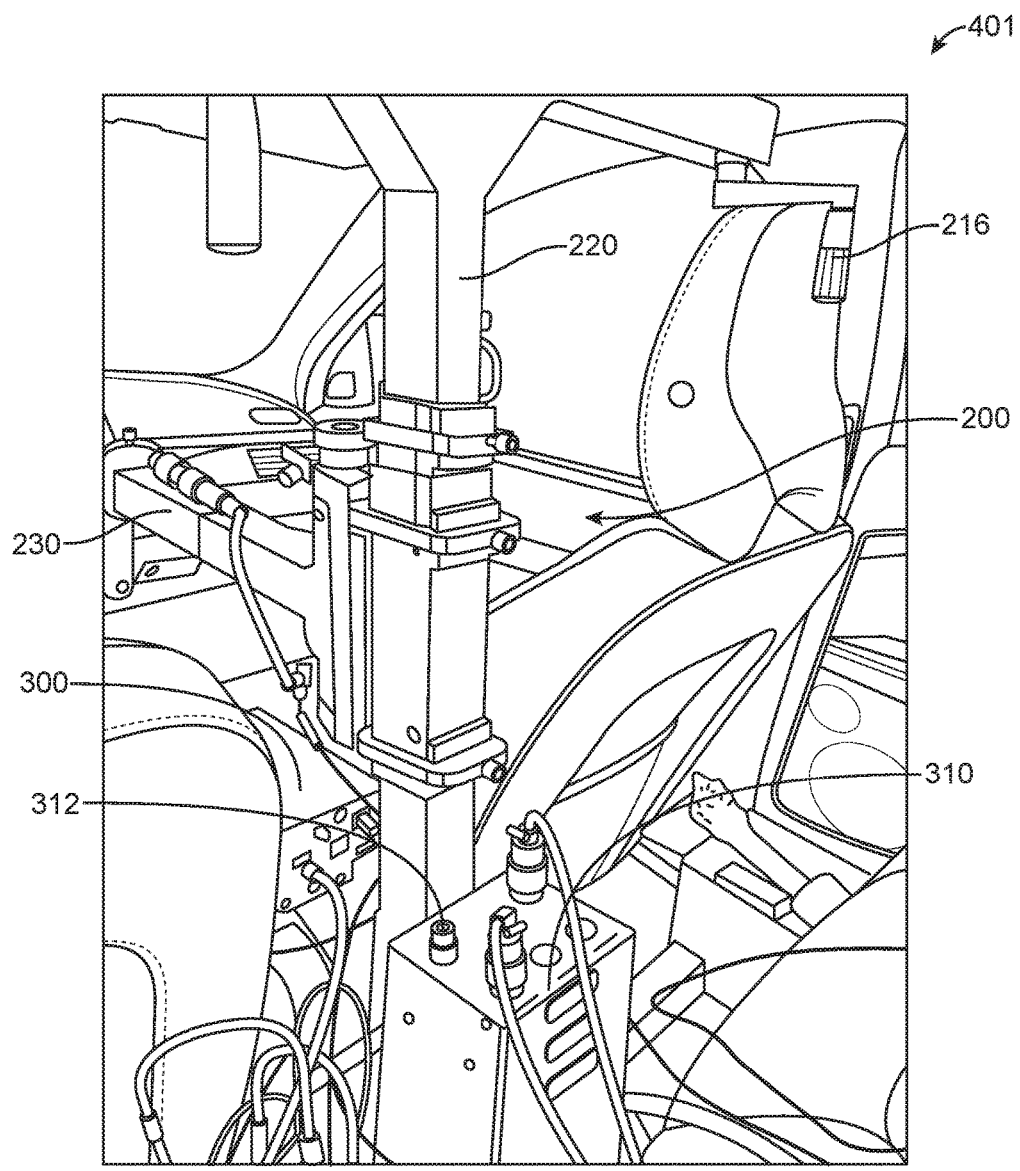
FIG. 4 shows a portion of a drop-in actuation kit installed in a vehicle according to some embodiments.
Figure 15:
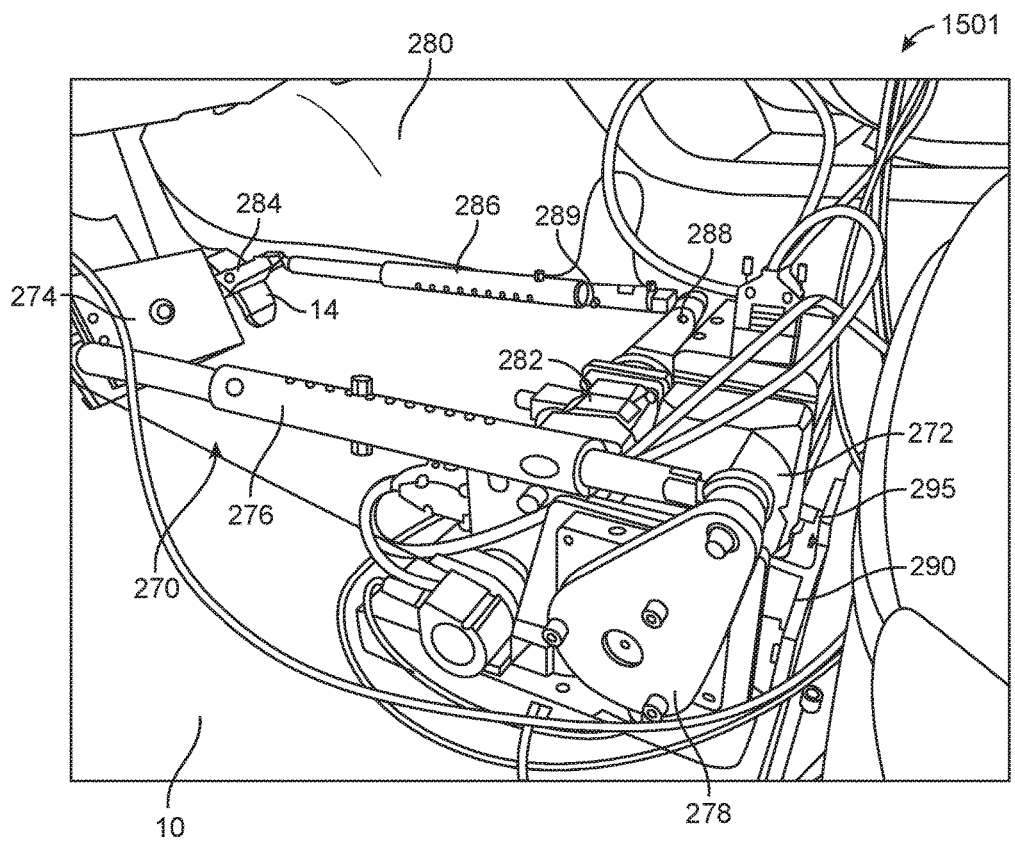
FIG. 15 shows a portion of a drop-in actuation kit installed in a vehicle according to some embodiments.

In some embodiments, RUs include vehicles equipped with a drop-in actuation kit ("DAK"), as shown, for example, in FIGS. 2-4 and 15. Drop-in Actuation Kit equipped test vehicles are those robotically equipped test vehicles that include an ARTS drop-in kit, which is described in more detail below, for rapid adaptation to participate in ARTS. FIG. 2 shows portion 201 of a DAK-equipped test vehicle. FIG. 3 shows portion 301 of a DAK-equipped test vehicle. FIG. 4 shows portion 401 of a DAK-equipped test vehicle. FIG. 15 shows portion 1501 of a DAK-equipped test vehicle. In some embodiments, RUs include vehicles having custom equipment. Custom equipped test vehicles are those robotically equipped test vehicles that have custom actuation mechanisms and controls embedded to allow them to participate in ARTS. These custom equipped test vehicles have steering actuators mounted directly to control points (e.g., steering, brake, and accelerator actuators), have communication interfaces to drive by wire controls, or control some auxiliary motivation means such as an electric vehicle drive system and braking.

In some embodiments, RUs include target robots 100, which may be a target robot vehicle ("TRV") (as shown, for example, in FIG. 5), a target robot pedestrian ("TRP") (not shown), a target robot cyclist ("TRC") (not shown), TRVs are those target robots that participate in ARTS and that simulate other vehicles into which test vehicles can safely collide. TRPs are those target robots that participate in ARTS and that simulate pedestrians into which test vehicles can safely collide. TRCs are those target robots that participate in ARTS and that simulate cyclists into which test vehicles can safely collide. Other targets which participate in ARTS which provide a means for test vehicles to safely collide also are possible.

Figure 6:
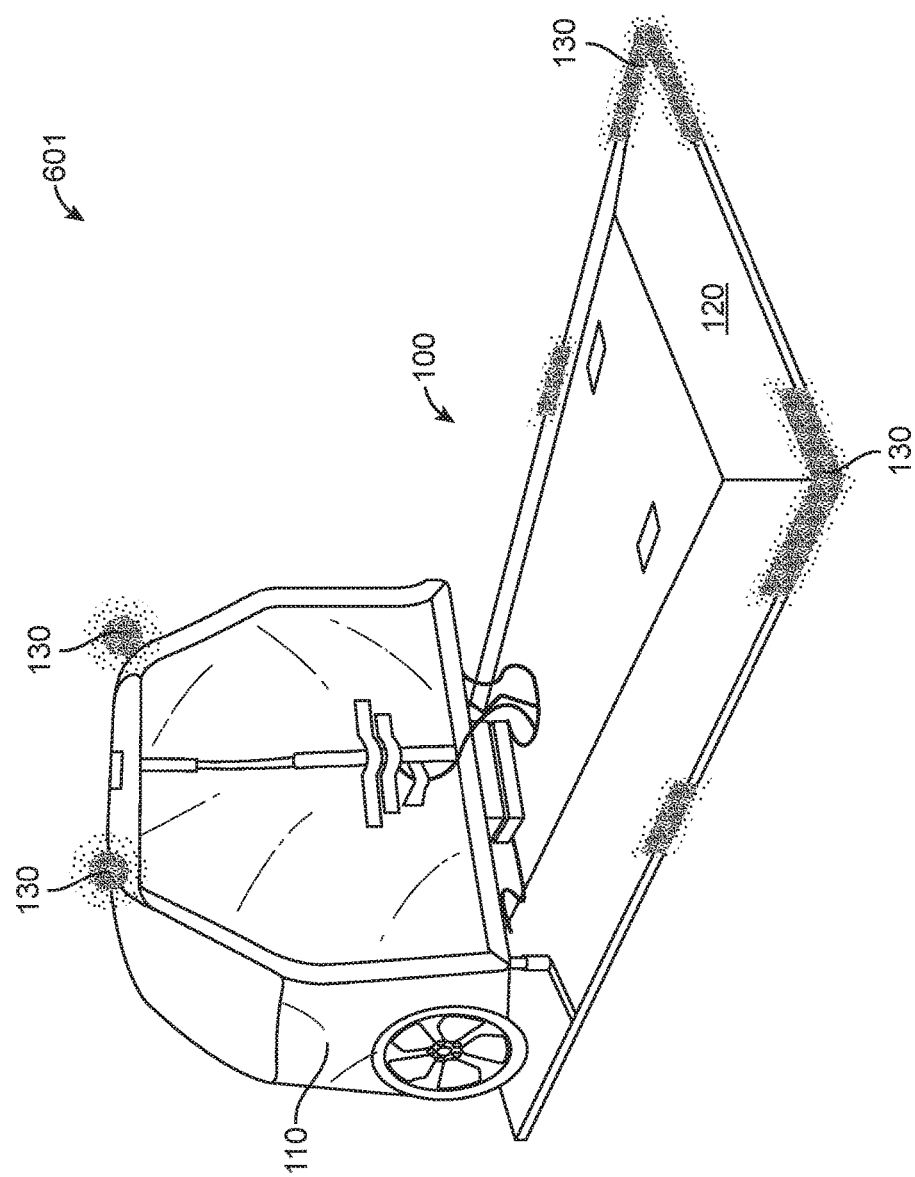
FIG. 6 shows a perspective view of a target robot vehicle according to some embodiments.

ARTS RUs are capable of robotic control during nighttime and poor visibility conditions on test tracks. For example, as shown in FIG. 6, RUs such as TRV may be equipped with lights 130 for use during the nighttime and during poor visibility conditions. In addition, in some embodiments, ARTS provides the common ability to control RU directions, speeds, and accelerations regardless of the visibility conditions.

In some embodiments, ARTS provides common sensing and recording of RU data. This data is time stamped using a common reference system-wide time (e.g., use of positioning system timestamp or synchronized times). In some embodiments, ARTS RU positions, velocity, accelerations, headings, roll, pitch, and heading rates are sensed and recorded. In some embodiments, ARTS positioning system signal losses and health and status are sensed and recorded as well. In some embodiments, relative positions, speeds, and headings between RUs are also sensed and recorded. In some embodiments, ARTS also automatically detects that collisions have occurred by inference from reported RU location data. In some embodiments, ARTS records impact information that is available. In some embodiments, the impact location on an RU of a collision is also recorded.

In some embodiments, ARTS RU position, velocity, acceleration, heading, heading rates, and other RU state information is communicated between RUs over the ARTS COMS. In some embodiments, ARTS RU position, velocity, acceleration, heading, heading rates, and other RU state information is also communicated from RUs to HMIs over the ARTS COMS. In some embodiments, ARTS RU state information and test results are communicated from RUs to Command, Control and Intelligence ("C2I") servers over the ARTS COMS. Other devices on the ARTS COMS network may also listen for information communicated from RUs on a publish/subscribe or broadcast listener basis. In some embodiments, ARTS provides the capability to sense and record data when the front of a designated RU is placed against the back of another designated RU such that in post-test processing a correction to the relative position of the RUs can be corrected (e.g. offset vector with magnitude and direction of offset).

In some embodiments, upon loss of positioning data, an ARTS RU is capable of dead reckoning when it is in autonomous mode. Dead reckoning in an RU involves controlling the RU to move along its prescribed path in the prescribed manner (e.g., by dead reckoning) for a preset time. For example, an RU may be controlled by dead reckoning to move along its prescribed path on the order of several seconds (e.g., 2-15 seconds) before taking loss of positioning action (e.g., stopping). In some embodiments, the preset time is dependent on the speed of the RU. For example, the preset time may be longer if the RU is going slower. In some embodiments, ARTS RUs may be configured for dead reckoning to either be enabled or disabled.

In some embodiments, ARTS provides control of multiple robotic units. For example, ARTS may control any combination of one or more ARTS RUs. In some embodiments, ARTS provides a slave-master control in which one or more ARTS RUs are capable of responding to changes in one or more other ARTS RU trajectories.

In some embodiments, the ARTS can calculate time to collisions ("TTC"). For example, the TTC between one ARTS RU and another ARTS RU can be computed based on current position, velocity, and planned paths of the two RUs. In some embodiments, when calculating the TTC, ARTS is configured to include the current acceleration of both the RUs assuming that the accelerations do not change (i.e., constant acceleration until the collision). In some embodiments, when calculating the TTC, ARTS is configured to include the planned acceleration of both the RUs.

Common RU Movement Planning

In addition to common RU instrumentation and controls, there exists common higher-level RU functions for programming and coordination of the movements and maneuvers of the ARTS RUs. In fact, these common RU movement planning functions are extensions of behaviors embodied in the GPRSP UGV and GPRSP common platform software layers. Here, the term GPRSP RUs is used to refer to those robots which either embody ARTS RUs, GPRSP Automotive UGVs, GPRSP UGVs, or some other GPRSP robot.

In some embodiments, a GPRSP RU is capable of being configured to autonomously navigate according to a defined route. These defined routes include a sequence of positions for which the robot must reach (i.e., waypoints). The defined route may include a specified lane width for a GPRSP RU. The GPRSP RU may be configured to repeat traversing a defined route according to a designated number of repeat times (e.g., traverse this route 10 times), if it is a closed route.

In some embodiments, a GPRSP RU is capable of being placed into a route-training mode. Here, the robot is commanded to start route-training and begins generating new waypoints based on one or more configurable events. These events include generating new waypoints based on 1) a designated time since generating a previous waypoint, 2) a designated distance travelled since generating a previous waypoint, 3) a designated change in direction of travel, 4) a triggered event (e.g., user HMI input), or 5) some other configured event for which a concrete trigger may be implemented according to a pre-defined software interface. Trained routes are then commanded to end and recorded. In some embodiments, the control of the GPRSP RU during route-training mode is done via tele-operation by a remote user. In some embodiments, the control of the GPRSP RU during route-training mode is done via an operator on-board the GPRSP RU.

In some embodiments, GPRSP RU is capable of being configured to execute autonomous movement plans. Autonomous movement plans have a configurable identifier for identifying the type of movement plan being executed and a timestamp indicating the start and end time of the movement plans execution. In some embodiments, movement plans may define a coordinated movement (e.g., a collision avoidance test procedure) for a robot. In some embodiments, movement plans may also define an independent movement procedure for a robot, independent of its involvement in a coordinated movement (e.g., relocate target robot from end point to a test restart point). In some embodiments, ARTS can also sense and record ARTS RU time-stamped speeds and movement plan identifiers such that calculations made external to the system can determine the elapsed time for an ARTS RU being stationary, the elapsed time since some event (e.g., brake warm-up), and the elapsed time between individual movement plan executions.

Here, movement plans may represent test procedures, vehicle warm-up procedures, logistical movements on a track, maneuvers which form part of an autonomous driving task, robot navigation maneuvers, or some other general plan for autonomously moving a GPRSP RU.

Example embodiments of movement plans embodying test procedures include specific Forward Collision Warning (FCW) test procedures, specific Dynamic Brake Support (DBS) test procedures, specific Crash Imminent Braking (CIB) test procedures, specific Lane Departure Warning (LDW) test procedures, Autonomous Emergency Braking (AEB) test procedures, AEB Inter-Urban test procedures, Insurance Institute for Highway Safety (IIHS) defined test procedures, and other concrete test procedures which may be implemented according to a pre-defined software interface and programmed using the generic flexible programming methodology defined below for triggering one or more movement actions based on one or more parameterized conditions.

Example embodiments of movement plans embodying autonomous driving maneuvers include following a leading vehicle, avoiding a collision with an object, avoiding running into a ditch or hole, merging at an intersection, avoiding a collision while staying in a lane, parking, passing another vehicle, avoiding a collision with a close proximity object, rerouting, following a road, stopping at stop signs or points, U-turns, avoiding a collision with an overhanging object, traversing an open zone, and other concrete autonomous driving maneuvers which may be implemented according to a pre-defined software interface and programmed using the generic flexible programming methodology defined below for triggering one or more movement actions based on one or more parameterized conditions.

Example embodiments of movement plans embodying robot navigation maneuvers include avoiding traveling over a cliff, roaming until finding a perceived feature, avoiding collisions with environmental objects, avoiding imminent impacts, roaming until triggering of some conditional event based on robot sensors or state, and other concrete robot navigation maneuver which may be implemented according to a pre-defined software interface and programmed using the generic flexible programming methodology defined below for triggering one or more movement actions based on one or more parameterized conditions.

As mentioned above, GPRSP RUs can be programmed using a generic flexible programming methodology defined for triggering one or more movement actions based on one or more parameterized conditions. Thus, an ARTS RU, for example, may be programmed to execute a test procedure by specifying that it speed up to 10 mph (action), reach 10 mph (condition), travel 100 meters (action), reach that 100 meter mark (condition), then decelerate at 0.3 g (action), reach 0 mph (condition), then exit the maneuver (action).

Autonomous movement plans can define a sequence of movement actions for execution by a GPRSP RU. These movement actions are capable of being triggered based on one or more parameterized conditions. An arbitrary boolean expression of results of one or more parameterized conditions may be evaluated to determine whether or not one or more movement actions are to be triggered. Movement actions may also be triggered by an implied sequence or event.

Parameterized conditions define one or more inputs or state conditions of a GPRSP RU that when evaluated to meet a configured value, trigger one or more movement actions. Example embodiments of parameterized conditions include time to collision (TTC), reaching of a designated position, reaching of a designated speed, reaching of a designated acceleration (longitudinal, lateral, or otherwise), reaching of a designated steering angle of the robot (e.g. angle of vehicle steering such as 10 degrees to right), relative distance to another designated robot, relative speed difference with another designated robot, configured digital input value, configured analog input value, a timeout (a.k.a delay time), completion of a previous movement action (i.e. a sequence), reaching of a designated heading, reaching of a designated lateral track offset, relative offset in a direction (lateral, longitudinal, or otherwise) relative to another designated robot position, reaching of a designated brake actuator position, reaching of a designated brake external position, reaching of a designated brake external force, reaching of a designated throttle actuator position, detection of a sound event (e.g. audible collision avoidance warning), detection of a visible event (e.g visible collision avoidance warning), detection of a haptic event (e.g. collision avoidance seat vibration), detection of a robot collision event, waiting for a specified amount of time, and other concrete conditions which may be implemented according to a pre-defined software interface.

Movement actions define an action to take based on evaluation of one or more parameterized conditions. Example embodiments of movement actions include setting the speed of a GPRSP RU at a designated rate, accelerating or decelerating a GPRSP RU at a specified rate, setting the steering angle of a GPRSP RU at a designated rate, setting the brake position at a designated rate, setting the brake force to apply at a designated rate, setting the throttle position at a designated rate, setting the brake according to a specified position or force profile over time with linear interpolation between specified values, setting the throttle according to a specified throttle position over time with linear interpolation between specified values, setting the steering according to a specified angle profile over time (e.g. sinusoidal steering at a designated frequency and designated amplitude), setting the steering according to a sinusoidal profile at a designated frequency and designated amplitude, disengagement of brake actuation control, disengagement of throttle actuation control, disengagement of steering actuation control, setting the steering angle according to a specified steering angle over time with linear interpolation between specified values, setting the speed according to a specified speed over time with linear interpolation between specified values, specifying some delay or timeout before moving onto the next movement action(s), specifying steering to some heading at a designated rate, specifying steering around another designated GPRSP RU, specifying use of a new alternate pre-defined route, specifying use of a new alternate route whose positions are offset by some specified vector (distance and direction) relative to a designated GPRSP RU (include the current GPRSP RU's) position, advancing to the next movement action(s) in a sequence, setting the current GPRSP RU speed to a speed relative to another designated GPRSP RU's speed, completion of a movement plan and stopping the GPRSP RU, setting a digital output to a specified state, setting an analog output to a specified state, indication of the start or end of a test evaluation, logging of a configured event description (e.g. ABS Activation), and other concrete movement actions which may be implemented according to a pre-defined software interface.

Movement actions may be teed up for execution explicitly under programmatic or user induced control. For example, an ARTS user may specify that a specific FCW test procedure be executed. This is an example of one movement plan being explicitly teed up for execution. This is useful for controlled testing of specific movement plans such as that commonly encountered by users of ARTS for testing ADAS or collision avoidance capabilities of vehicles.

Movement actions may also be themselves triggered based on parameterized conditions. For example, if the movement actions of lane following, avoiding a collision while staying in a lane, passing, and stopping are all possible movement actions for a vehicle navigating along a route, it may first engage in lane following, then be triggered to avoid a detected obstacle in its path, passing the detected obstacle, lane following again, then stopping at a stop point. These are all specific movement plans (a.k.a. maneuvers in this context) that can be triggered based on events. In this case, the parameterized conditions embody sensory events (e.g. obstacle detected, position on a map) or robot state (e.g. a stop point reached on a map). Thus, these one or more parameterized conditions derived from sensors or system state can be used to trigger one or more maneuvers (i.e. movement plans).

Arbitration of movement plans determine which movement plans, if multiple are triggered, may be executed at any one moment. Multiple movement plans may execute at the same time (e.g. lane following and following a leading vehicle). In some cases, one movement plan may trump and overtake another movement plan (e.g. stopping before colliding versus continuing to lane follow). The GPRSP UGV and ARTS software allows for programmability of this arbitration, and triggering of one or more movement plans based on one or more parameterized conditions.

Drop-in Actuation Kit (DAK) Instrumentation & Controls

In some embodiments, test vehicles are the vehicles under test in ARTS. In some embodiments, they may be partially operated by a test driver. In some embodiments, they may be fully autonomously controlled in ARTS. The ARTS components used to control the Test Vehicles is termed the Drop-in Actuation Kit ("DAK"). In some embodiments, the DAK consists of a Mechanical Actuation Kit ("MAK"), an Electronics Box ("E-Box"), a Battery Box ("B-Box") with associated antennae, other component packaging, displays, and cables. Components of the DAK are shown, for example, in FIGS. 2-4 and 7-17. In some embodiments, the MAK consists of actuation of steering with a steering actuator 200 (see FIGS. 2 and 7), actuation of the brake with a brake actuator 270 (see FIGS. 15-16), actuation of the throttle or accelerator with a throttle actuator 280 (see FIGS. 15-16), and optional transmission/gear controls (e.g., control of automatic PRNDL gearing or manual transmissions).

In some embodiments, the ARTS DAKs have multiple control modes. Example modes of control for the ARTS DAKs in some embodiments may include:

Normal mode: All actuators (e.g., steering actuator 200, brake actuator 270, throttle actuator 280) are disengaged. Test drivers operate the vehicle without any robotic intervention.

Tele-operated mode: The DAK-equipped test vehicles are operated via tele-operated remote control of the actuators.

Autonomous mode: Self-navigation controls operate the vehicle speed and steering controls to keep the vehicle on track according to the movement plan and can release or maintain controls in a configurable fashion depending on whether or not collision avoidance controls engage. A test driver may sit onboard ready to override and take control of the vehicle as well as shut it down at any point. Any combination of steering, throttle, and braking can also be disengaged in autonomous mode, allowing for braking only, throttle only, steering only, and speed controls.

Common RU Instrumentation & Controls as well as Common RU Movement Planning are embodied in DAKs. In addition to such common functions, additional DAK specific capabilities are also provided and described here.

In some embodiments, a Test Driver is able to override and control a DAK-equipped test vehicle. For example, DAKs are capable of full autonomous operation of a test vehicle, with close onboard supervision by a Test Driver and are designed to not impede the Test Driver's ability to safely and effectively operate the Test Vehicle's steering, throttle, and brake. As such, the Test Driver can sit in the driver's seat, with the MAK part of a DAK installed. As such, the Test Driver can manually steer the steering wheel and operate the brake and throttle with the MAK installed.

The Test Driver can select between Normal, Tele-Operated, and Autonomous modes of operation, turn on/off any combination of actuators (e.g., steering actuator 200, brake actuator 270, and throttle actuator 280), select speed only and steering only actuation modes, or select fully autonomous control modes.

The DAKs may be installed in a wide range of test vehicles. This includes vehicles as small as Fiat 500s and as large as large SUVs. The DAK is thus a general purpose drop-in actuation kit for a wide range of commercial vehicles. The DAK is designed to be installed in any test vehicle without modification or damage to the vehicle. Moreover, the DAK also allows a driver to monitor operation and intervene if necessary to take control of the vehicle. The ARTS DAK is designed for rapid installation and removal and does not require cutting, drilling, or welding. Nor does it cause other permanent damage to the test vehicle.

Steering actuator 200 is shown, for example, installed in a vehicle 10 in FIGS. 2-4. DAK steering is achieved via a steering motor 250 attached to a steering wheel 12 to turn the steering wheel 12. In some embodiments, the steering motor 250 is attached to a steering mechanism 260 that attaches to the existing steering wheel 12. Because the DAK is designed to fit a wide range of vehicles, in some embodiments, adjustment mechanisms 240 are employed which allow for elliptical and asymmetric, as well as circular and symmetric, steering. The steering mechanism 260 is attached to a steering reaction stand 220. In some embodiments, steering reaction stand 220 sits behind the front seats with feet 206 that sit on the floor behind the seats. In some embodiments, an adjustable rod 230 extends from the front to the rear to allow for sizing the installation to a vehicle 10. The stand 220 also has adjustable mounts 210 which apply pressure to a roof to keep the stand 220 stable. A secondary steering wheel 264 is provided to allow the human driver to also steer the steering wheel 12. As such, no modification or damage is incurred to the vehicle for steering and the operator can still intervene and operate the steering wheel 12 via a secondary steering wheel 264.

In some embodiments, components of steering actuator 200 include steering reaction stand 220, adjustable rod 230, adjustment mechanism 240, steering motor 250, and steering mechanism 260. In some embodiments, steering reaction stand 220 along with adjustable rod 230 and adjustment mechanism 240, as shown, for example, in FIG. 7, acts as a support system 701 for other components of steering actuator 200. In some embodiments, steering reaction stand 220 extends from the floor of vehicle 10 to a roof of vehicle 10. In some embodiments, steering reaction stand 220 includes a top horizontal portion 222 and a vertical portion 224. Top horizontal portion 222 may be disposed near the roof of vehicle 10. In some embodiments, top horizontal portion 222 supports adjustable mounts 210.

Figure 8:
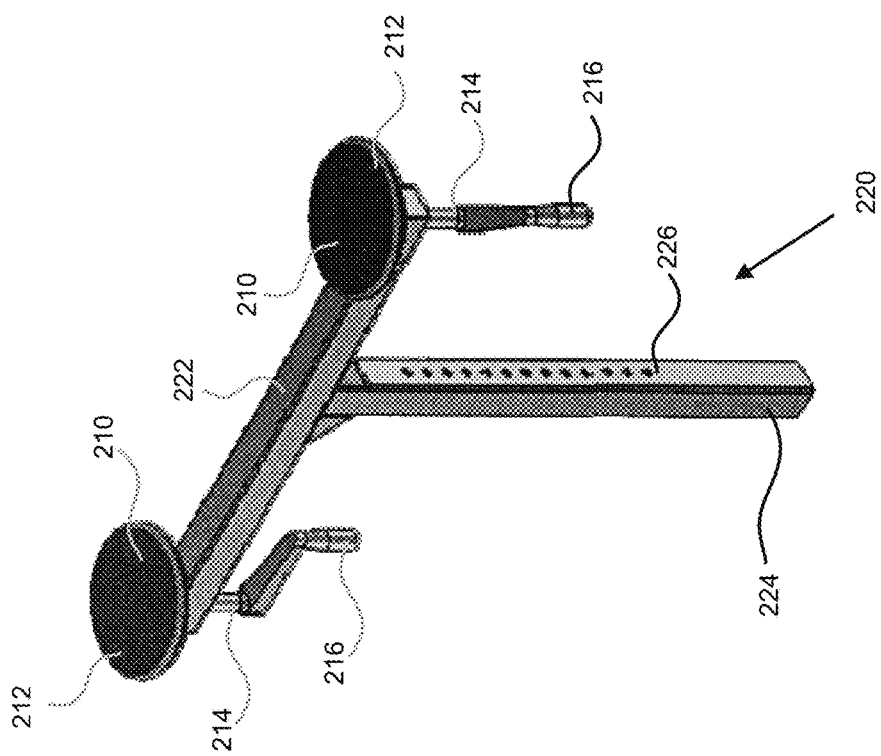
FIG. 8 shows a perspective view of a portion of a steering reaction stand of a drop-in actuation kit according to some embodiments.
Figure 9:
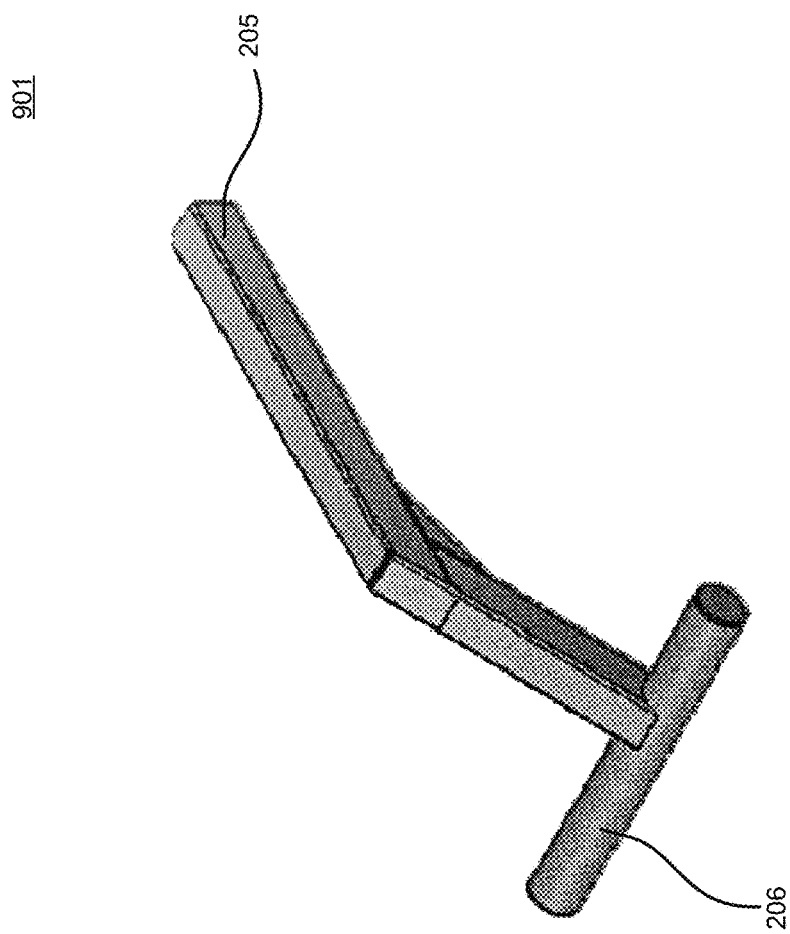
FIG. 9 shows a perspective view of a portion of a steering reaction stand of a drop-in actuation kit according to some embodiments.

In some embodiments, adjustable mounts 210 are disposed on each end of top horizontal portion 222, as shown, for example, in portion 801 of display stand 220 in FIG. 8. In some embodiments, adjustable mounts 210 are adjusted to apply pressure to the roof of vehicle 10. In some embodiments, adjustable mounts 210 include a roof interface 212 that directly contacts the roof of vehicle 10. Roof interface 212 may provide a flat upper surface. In some embodiments, roof interface 212 is circular. Alternatively, roof interface 212 may be shaped differently. For example, roof interface 212 may be rectangular, square, oval, triangular, or any other shape.

A variety of mechanisms may be used to allow for the adjustability of adjustable mounts 210. In some embodiments, a rod 214 may pass through a hole in top horizontal portion 222. In some embodiments, a handle 216 is attached to rod 214. Rod 214 may be threaded so that as handle 216 is turned in one direction, roof interface 212 is lifted up towards the roof of vehicle 10. As handle 216 is turned in the other direction roof interface 212 is lowered away from the roof of vehicle 10.

In some embodiments, vertical portion 224 is supported by legs 205, which extend to feet 206 that may rest on the floor of vehicle 10. In some embodiments, a bracket 202 receives vertical portion 224 and two legs 205 (see FIG. 7). In some embodiments, as shown, for example, in portion 901 of display stand 220 in FIG. 9, feet 206 extend in a direction perpendicular to legs 205 to provide greater stability to steering reaction stand 220.

Figure 7:
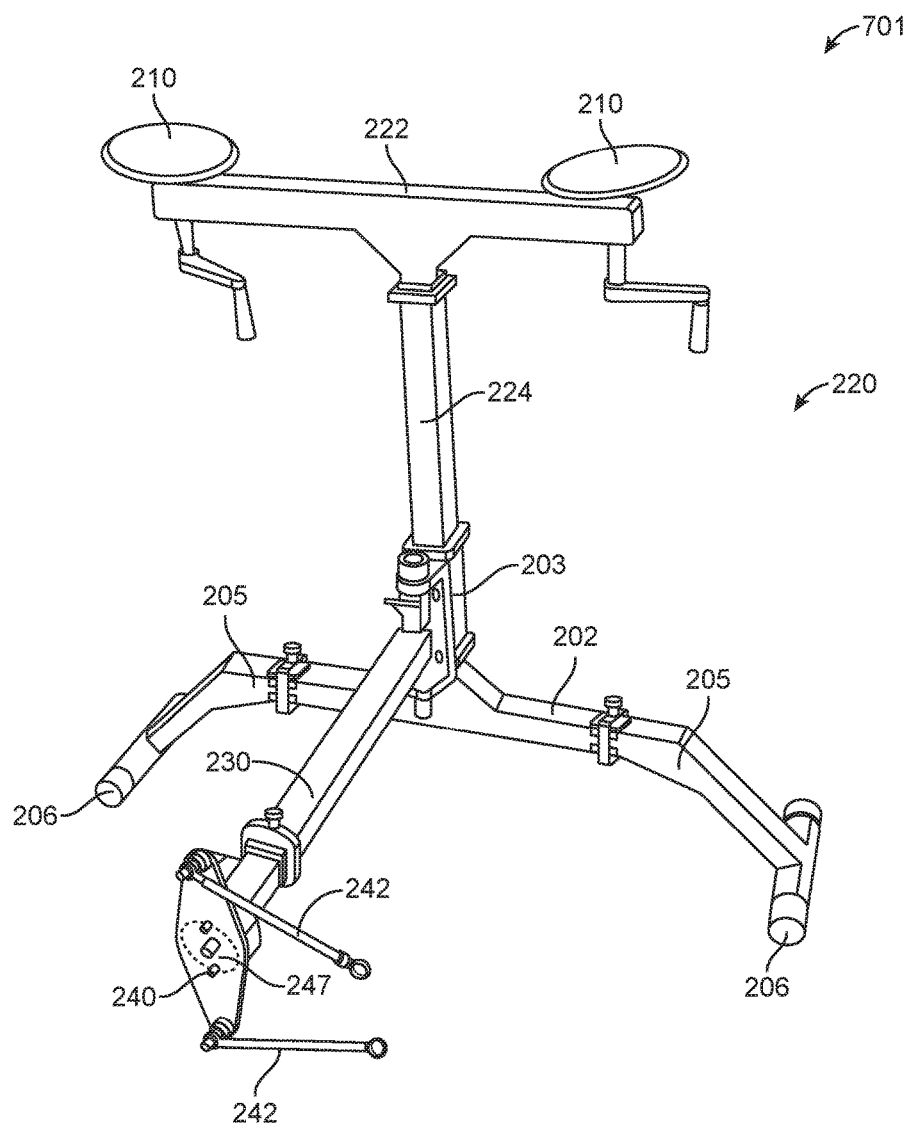
FIG. 7 shows a perspective view of a steering reaction stand of a drop-in actuation kit according to some embodiments.

In some embodiments, vertical portion 224 provides a mount for adjustable rod 230 that extends toward the front of vehicle 10 where adjustment mechanism 240 is attached to adjustable rod 230, as shown, for example, in FIG. 7. In some embodiments, vertical portion 224 includes a plurality of holes 226, as shown, for example, in FIG. 8, to allow for adjustable rod 230 to be mounted at different vertical locations. Holes 226 facilitate adapting steering reaction stand 220 for different styles of cars (e.g., different steering wheel heights relative to the floor of vehicle 10). In some embodiments, a mount 203 directly and adjustably attaches to vertical portion 224 and provides the connection for adjustable rod 230.

Figure 10:
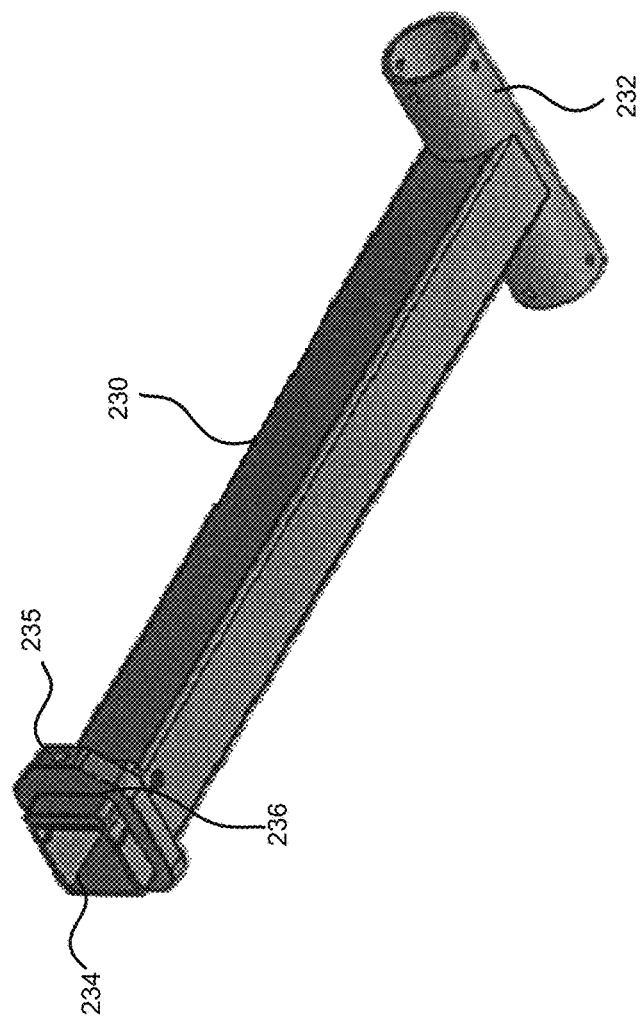
FIG. 10 shows a perspective view of a portion of a steering reaction stand of a drop-in actuation kit according to some embodiments.

FIG. 10 shows portion 1001 of the adjustable rod 230. In some embodiments, as shown, for example, in FIG. 10, adjustable rod 230 includes a sleeve 232 to mount to vertical portion 224 at one end of adjustable rod 230. For example, sleeve 232 may attach to vertical portion 224 via mount 203. In some embodiments, sleeve 232 may rotate around mount 203, thus contributing to the adjustability of steering actuator 200 as well as allowing steering motor 250 to move as it rotates steering wheel 12. At an opposite end, adjustable rod 230 includes an aperture 234 for receiving inner rod 238 (see FIGS. 11 and 12). In some embodiments, adjustable rod 230 is adjustable by inner rod 238 extending in and out of adjustable rod 230. In some embodiments, a collar 236 is disposed near aperture 234 with a hole 235 for receiving a fastener 237 (see FIGS. 11 and 12). Fastener 237 secures inner rod 238 so that adjustable rod 230 is an appropriate length for vehicle 10.

Figure 11:
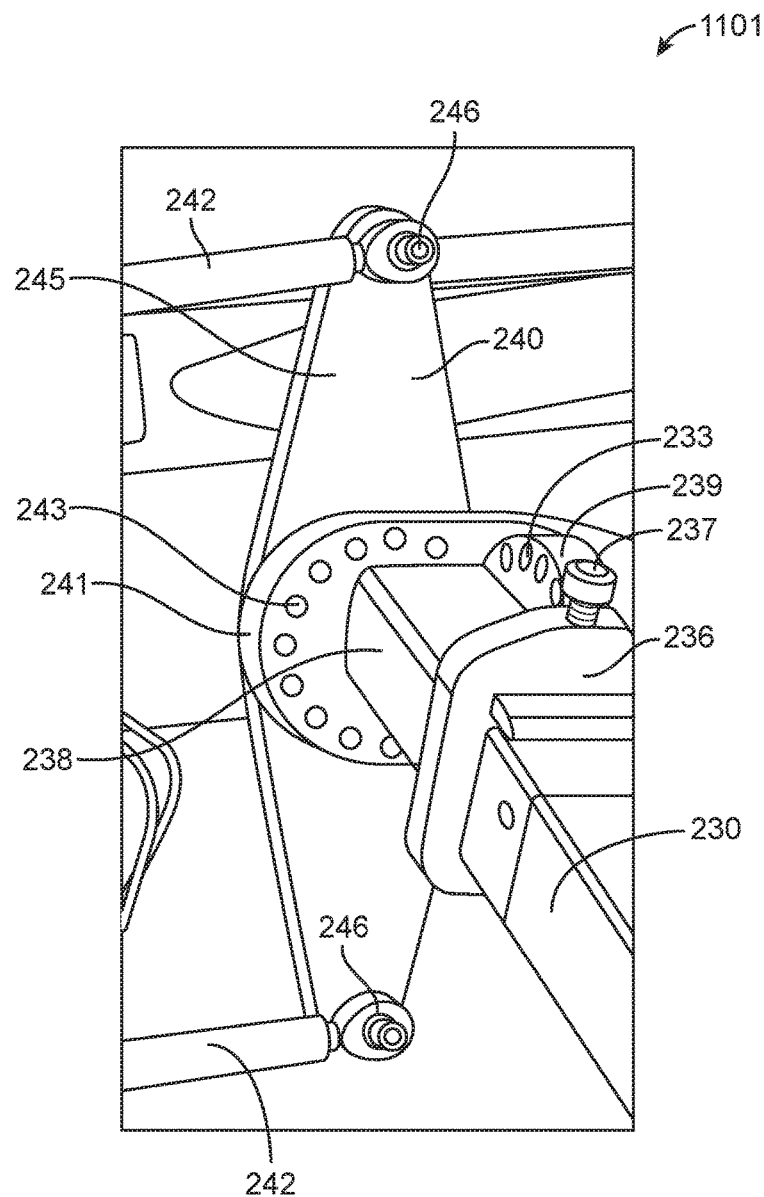
FIG. 11 shows a close-up view of a portion of a drop-in actuation kit according to some embodiments.
Figure 12:
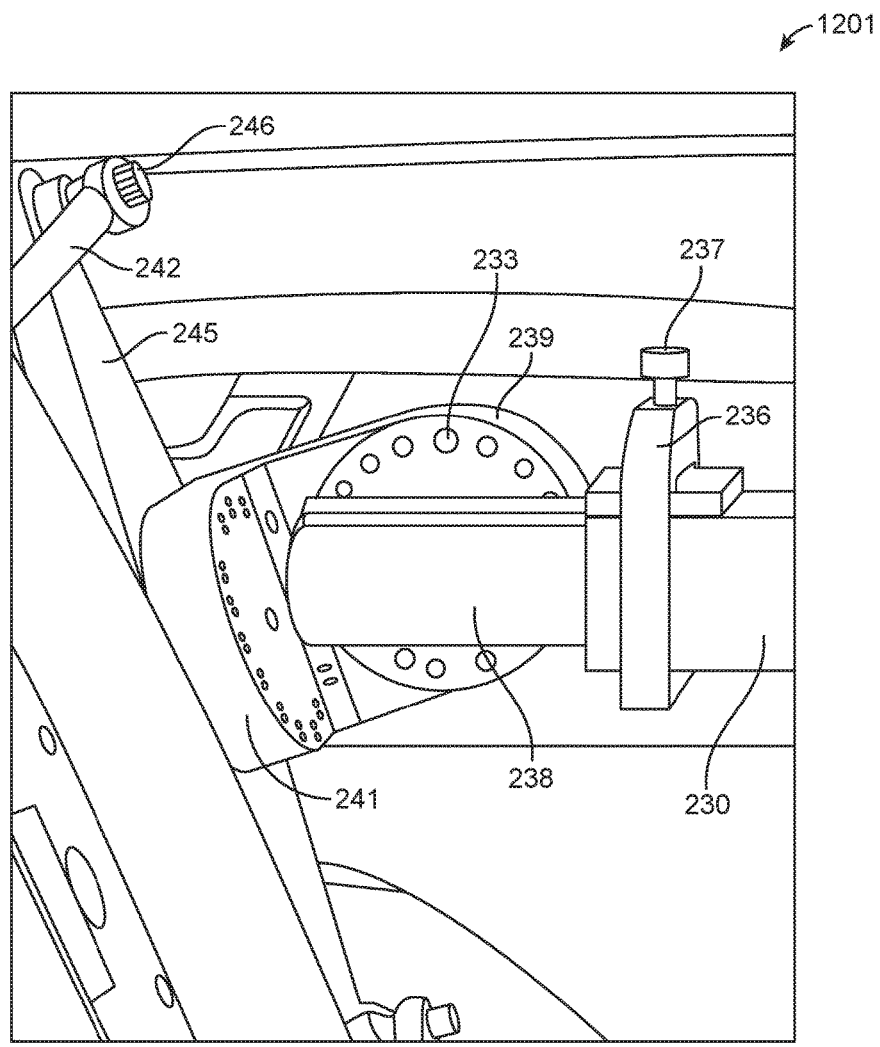
FIG. 12 shows a close-up view of a portion of a drop-in actuation kit according to some embodiments.

FIG. 11 shows portion 1101 of a DAK-equipped test vehicle. FIG. 12 shows portion 1201 of a DAK-equipped test vehicle. In some embodiments, as shown, for example, in FIGS. 11 and 12, inner rod 238 may include an attachment mechanism 239 for connecting adjustment mechanism 240 to steering reaction stand 220. For example, attachment mechanism 239 may be a circular component disposed on a side of inner rod 238. In some embodiments, attachment mechanism 239 may include a plurality of holes 233 around its outer edge.

In some embodiments, adjustment mechanism 240 includes a connecting portion 241, linking members 242, and a base portion 245. Connecting portion 241 provides for adjustment that may accommodate different types of steering wheels (e.g., elliptical and asymmetric steering, circular and symmetric steering). In some embodiments, connecting portion 241 is L-shaped. In some embodiments, connecting portion 241 comprises a plurality of holes 243 in a circular pattern disposed adjacent to base portion 245 and a plurality of holes (not shown) adjacent to attachment mechanism 239. In some embodiments, base portion 245 also includes a plurality of holes 247 (see FIG. 7). Thus, base portion 245 may be rotated relative to connecting portion 241 and fasteners may be inserted through some of holes 247 in base portion 245 and some of holes 243 in connecting portion 241 to hold base portion 245 at a particular position (see FIG. 11). Similarly, connecting portion 241 may be rotated relative to attachment mechanism 239 and a fastener may be inserted through holes in connecting portion 241 adjacent to attachment mechanism 239 and one of the plurality of holes 233 in attachment mechanism 239 to hold connecting portion 241 at a particular position (see FIG. 12). Thus, adjustment mechanism 240 may be adjusted in multiple directions to accommodate different steering wheels.

In some embodiments, linking members 242 are attached to base plate 245 with a fastener. Linking members 242 may be attached with a fastener 246 that permits linking members 242 to rotate around the fastener 246. This attachment also contributes to adjustment mechanism accommodating different steering wheels. In some embodiments, linking members 242 extend towards steering wheel 12 and attach to steering motor 250. Linking members 242 may attach to steering motor 250 in the same manner as linking members 242 are attached to base plate 245.

Figure 13:
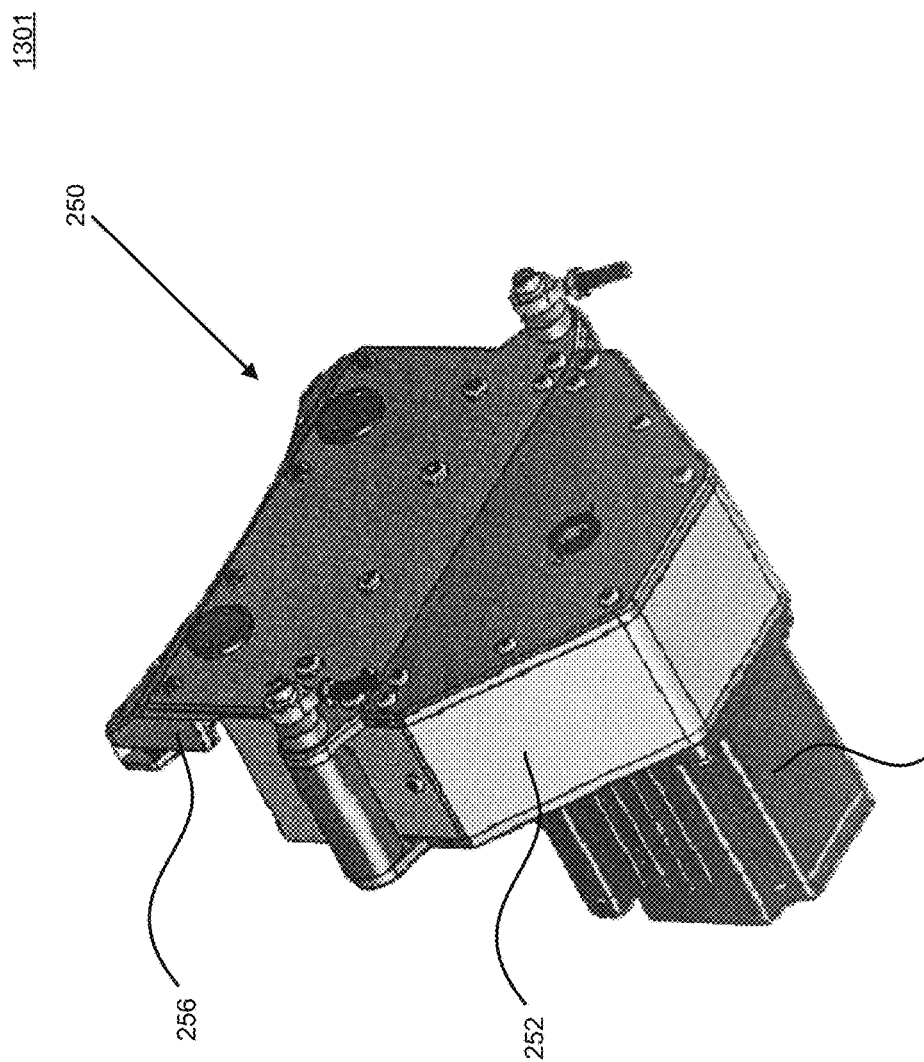
FIG. 13 shows a perspective view of a steering motor of a drop-in actuation kit according to some embodiments.

FIG. 13 shows portion 1301 of steering motor 250. FIG. 34 shows portion 3401 of steering motor 250. In some embodiments, steering motor 250, shown in FIGS. 13 and 34, provides the electrical and mechanical components that turn steering wheel 12. Steering motor 250 may include a gear box 252 that houses internal gears. In some embodiments, a motor 254 is attached to gear box 252 and interacts with the internal gears. In some embodiments, the internal gears operate to cause rollers 258 to rotate. In some embodiments, steering motor 250 attaches to steering mechanism 260 via an engagement portion 256. Engagement portion 256 attaches to steering mechanism 260 such that the rollers 258 will interact with steering mechanism 260 to turn steering wheel 12. For example, steering mechanism 260 may contain a series of grooves that interact with rollers 258. Other types of interactions may also be used.

Figure 14:
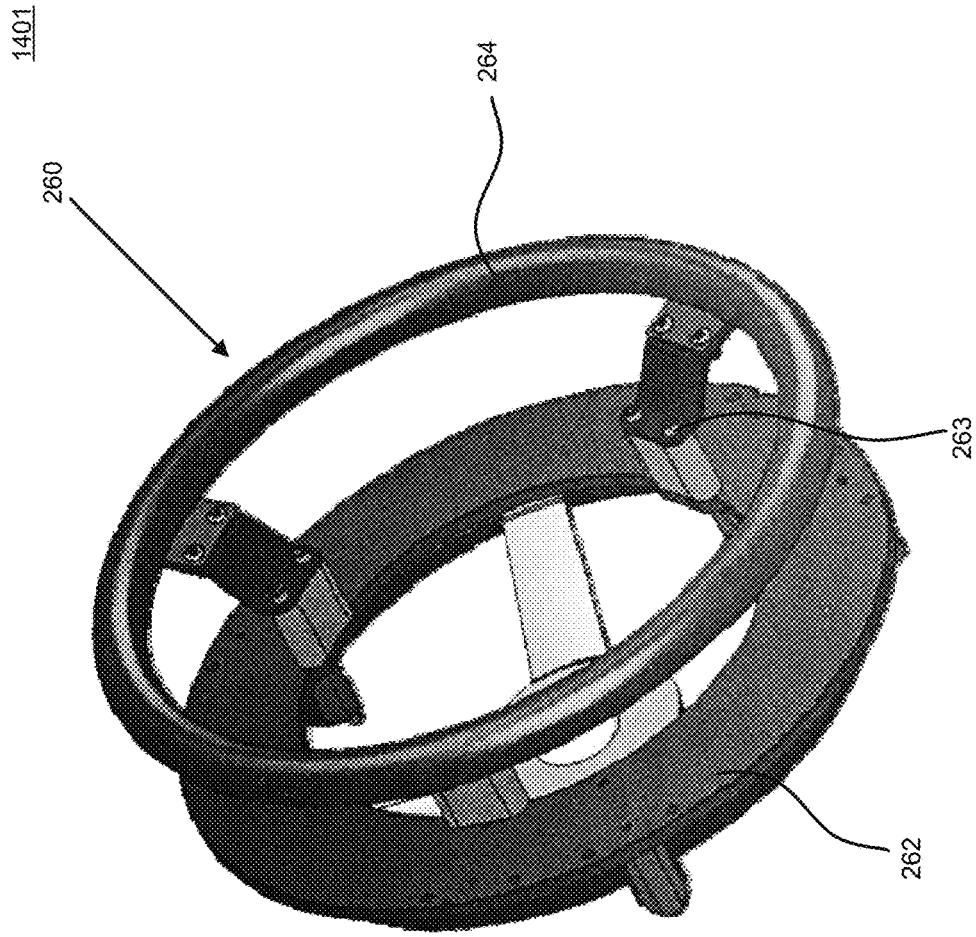
FIG. 14 shows a perspective view of a secondary steering wheel of a drop-in actuation kit according to some embodiments.

FIG. 14 shows portion 1401 of steering mechanism 260. In some embodiments, as shown, for example, in FIG. 14, steering mechanism 260 includes an engagement portion 262 and a secondary steering wheel 264. In some embodiments, engagement portion 262 surrounds and attaches to steering wheel 12. In some embodiments, engagement portion 262 is adjustable to allow for attachment to different sizes, shapes, and styles of steering wheels. In some embodiments, engagement portion 262 also provides the interface for engagement portion 256 of steering motor 250 (e.g., a series of grooves). In some embodiments, supports 263 are attached to engagement portion 262 and extend outward to connect to secondary steering wheel 264. Thus, while steering actuator 200 provides for automatic steering of vehicle 10, a driver may use secondary steering wheel 264 to steer vehicle 10. The manual steering by the driver may override the automatic steering by steering actuator 200.

Brake actuator 270 is shown, for example, installed in a vehicle 10 in FIG. 15. DAK brake controls are achieved via a motor 272 that controls an adjustable length linear rod 276 to apply and release the brake via an adjustable plate 274 that attaches to the brake pedal (not shown).

The brake rod 276 is slotted such that the driver can always apply the brake even if the braking actuator 270 is not applying the brake. The braking actuator 270 attaches to a floor plate 290 which can either be attached to seat bolts, as shown in FIG. 15, or a seat plate. For those vehicles having seat bolts on the floor, the floor plate 290 is attachable via different seat plate bolt attachment mechanisms. For those vehicles without easily accessible seat bolts, an L-shaped seat plate is used whereby the floor plate 290 is attached to the seat plate and the seat plate bends onto the seat with the driver sitting on top of the plate. As such, no modification or damage is incurred to the vehicle for steering and the operator can still intervene and operate the steering wheel 12 via secondary steering wheel 264. The driver has access to the brake pedal at all times. When the motors are disengaged electrically, the driver has full control over the brake (apply and release). As such, no modification or damage is incurred to the vehicle for braking and the operator can still intervene and operate the brake.

Figure 16:
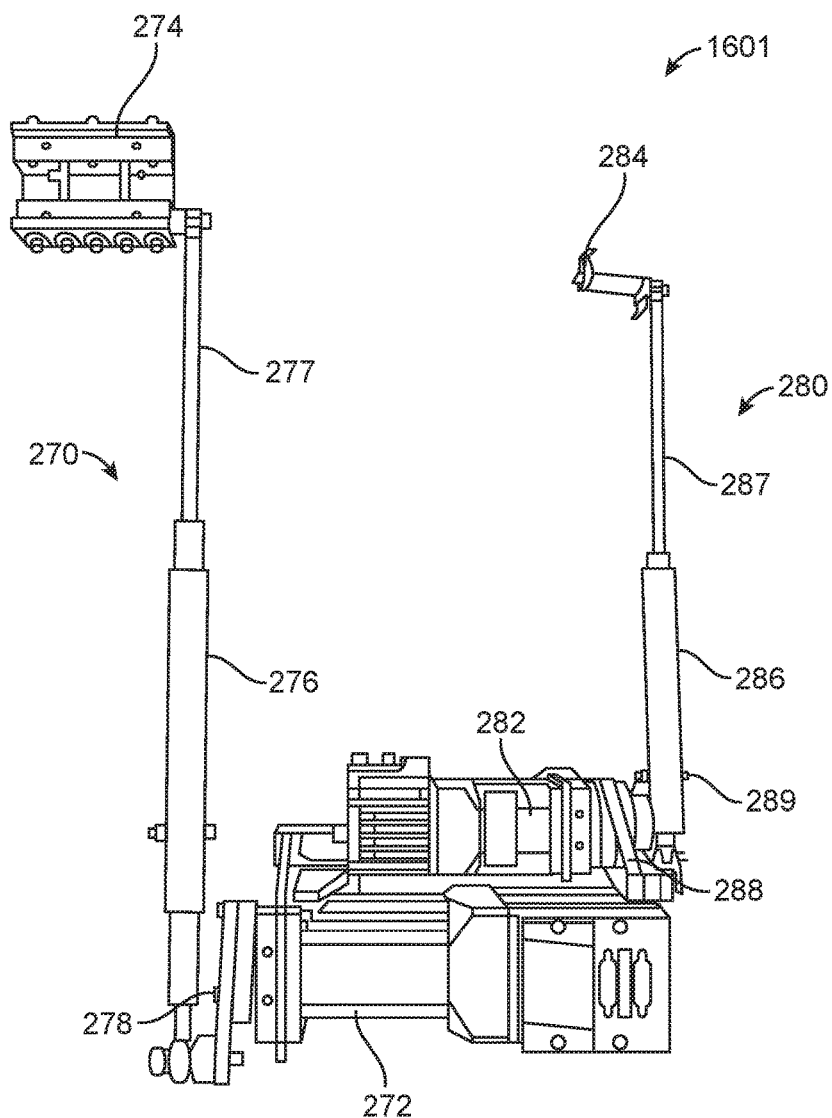
FIG. 16 shows a top view of a portion of a drop-in actuation kit according to some embodiments.

FIG. 16 shows portion 1601 of brake actuator 270 and throttle actuator 280. In some embodiments, as shown, for example, in FIG. 16, brake rod 276 includes an inner rod 277 that is configured to extend in and out of brake rod 276 to allow for adjustment to accommodate different distances between the brake pedal and floor plate 290. In some embodiments, inner rod 277 attaches to adjustable plate 274. The opposite end of brake rod 276 attaches to a rotating plate 278. In some embodiments, motor 272 controls brake rod 276 via rotating plate 278. For example, when brake actuator 270 is to apply the brake pedal (either from controls from a remote operator during tele-operated mode or from self-navigation controls during autonomous mode), motor 272 rotates rotating plate 278 towards the brake pedal. This movement of rotating plate 278 pushes brake rod 276, inner rod 277, and adjustable plate 274 towards the brake pedal, thereby pressing on the brake pedal to stop vehicle 10.

Throttle actuator 280 is shown, for example, installed in a vehicle 10 in FIG. 15. DAK accelerator (a.k.a. throttle) controls are achieved via a motor 282 that controls an adjustable length linear rod 286 to apply and release the accelerator pedal 14 via an adjustable plate 284 that attaches to the pedal 14. A quick release pin 289 is provided which may be pulled to mechanically disengage the accelerator rod 286 at any time in the event of an emergency. The accelerator actuator 280 attaches to a floor plate 295 that can either be attached to seat bolts or a seat plate using the same mechanisms for attachment as described above for the brake actuator 270. When the motors are disengaged electrically, the driver has full control over the accelerator (apply and release). As such, no modification or damage is incurred to the vehicle 10 for accelerator control and the operator can still intervene and operate the accelerator.

In some embodiments, as shown, for example, in FIG. 16, accelerator rod 286 includes an inner rod 287 that is configured to extend in and out of accelerator rod 286 to allow for adjustment to accommodate different distances between the accelerator pedal 14 and floor plate 295. In some embodiments, inner rod 287 attaches to adjustable plate 284. The opposite end of accelerator rod 286 attaches to a rotating plate 288. In some embodiments, motor 282 controls accelerator rod 286 via rotating plate 288. For example, when throttle actuator 280 is to apply the accelerator pedal 14 (either from controls from a remote operator during tele-operated mode or from self-navigation controls during autonomous mode), motor 282 rotates rotating plate 288 towards the accelerator pedal 14. This movement of rotating plate 288 pushes accelerator rod 286, inner rod 287, and adjustable plate 284 towards the accelerator pedal 14, thereby pressing on the accelerator pedal 14 to accelerate vehicle 10.

In some embodiments, one or more of motors 254, 272, and 282 may be smart motors. For example, the smart motors may contain closed loop feedback control so that brake position or throttle position commands may be given to motors and the motors will actuate the brake or throttle to the appropriate position. In some embodiments, the smart motors are first calibrated to the vehicle 10 to determine the maximum and minimum position of the brake or throttle so that the position control of the smart motors is tied to the position of the brakes or throttles themselves.

In some embodiments, the DAK may be utilized in test vehicle 10 without interfering with a driver (or passengers) sitting in vehicle 10 and operating test vehicle 10. For example, the driver may take control of vehicle 10 at any time. This may be done via electrically or mechanically disconnecting steering actuator 200, brake actuator 270, or throttle actuator 280.

The adaptability of the DAK's MAK steering, brake, and accelerator controls for a wide range of vehicles is described above. Additionally, the boxes (e.g., E-Box, B-Box) that house equipment for controlling these control points are designed to be small enough for placement inside of the vehicle in a variety of locations. The front passenger seat or floor, the rear seats or floor, and the trunk, are common options for placement of control and power equipment. The control and power equipment includes electronics equipment boxes (E-Boxes), communications equipment boxes, and battery boxes (B-Boxes). Different length cables between and among the MAK and these equipment boxes are provided to allow for placement inside of the vehicle in a variety of configurations. DAK equipment boxes are thus designed for installation in a test vehicle's front passenger seat or floor, rear seat or floor, and trunk. This is also achieved by sizing of the boxes small enough to fit in the widest range of vehicles.

Figure 17:
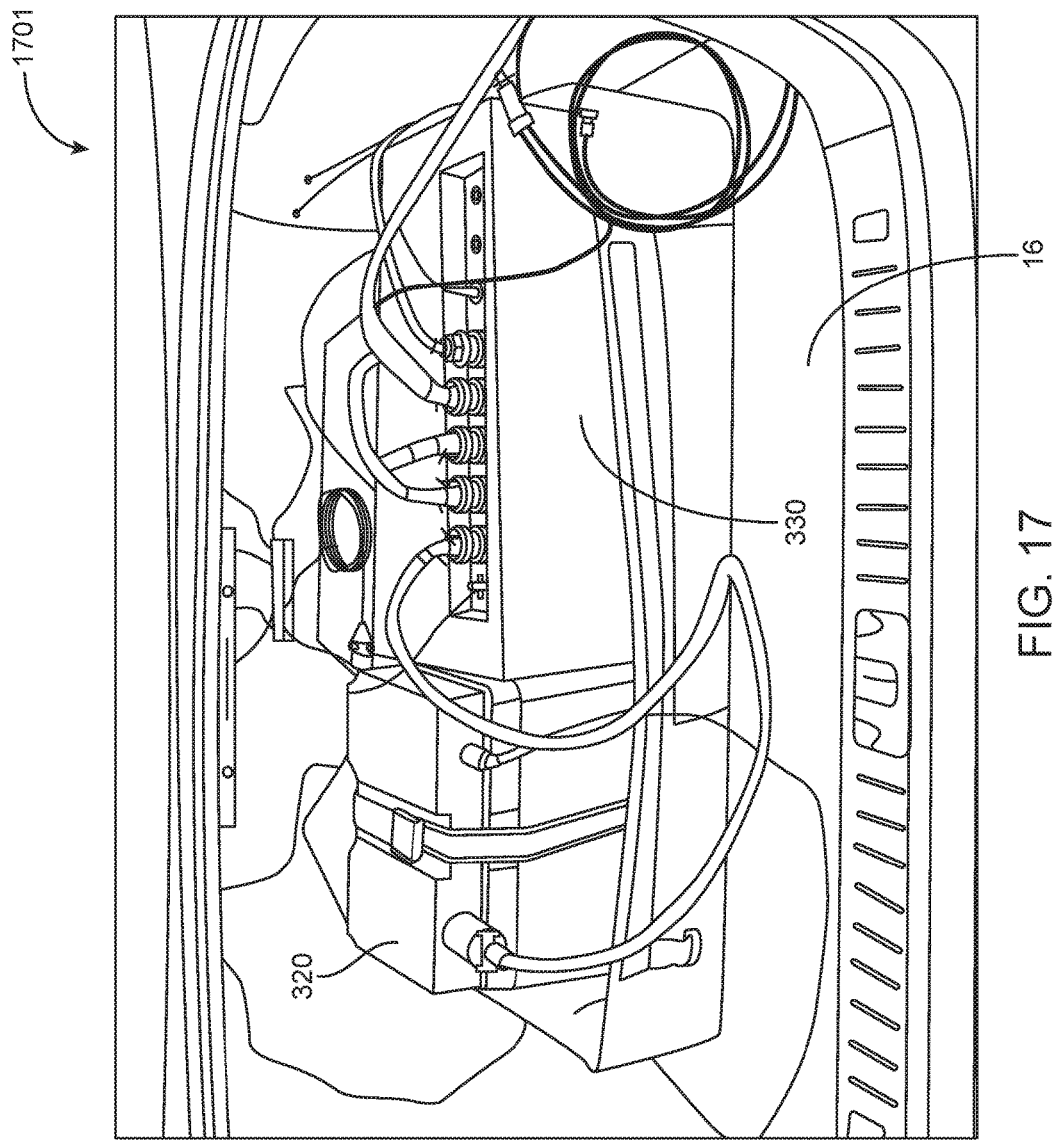
FIG. 17 shows a portion of a drop-in actuation kit installed in a vehicle according to some embodiments.

For example, in some embodiments, an E-Box or communications equipment box or other kind of box 300 may be disposed on the console between the passenger seat and the driver seat, as shown in FIGS. 3 and 4. In some embodiments, an E-Box or other type of equipment box 310 may be disposed in between the rear seat and steering reaction stand 200, as shown in FIG. 4. In some embodiments, as shown for example in FIG. 17, a B-Box 320 and an E-Box or equipment box 330 may be disposed in a trunk 16 of vehicle 10. FIG. 17 shows portion 1701 of a DAK-equipped test vehicle.

The DAK equipment boxes are designed to be mounted in a way that can rigidly stay in place inside of the test vehicle during a collision with a TRV. For example, an adjustable rod may be provided in some embodiments which applies pressure between a box and an interior point on the vehicle. One or more of these rods can be used to secure an equipment box in place.

In some embodiments, the DAK B-Box is designed to be chargeable external to the test vehicle 10 via a charging port on the B-Box. The DAK B-Box may also be designed for optional charging from the test vehicle power system via a charging port on the B-Box. In some embodiments, the DAK B-Box is designed to be interchangeable with another B-Box.

In some embodiments, the ARTS DAK senses and records actuation and control point measurements such as Test Vehicle brake pedal force (i.e., force on pedal itself external to actuator 270), Test Vehicle brake pedal position (i.e., position of pedal independent of actuator 270), Test Vehicle MAK brake actuator position (i.e., position of brake actuator 270), Test Vehicle throttle position (i.e., position of throttle 14 independent of actuator 280), Test Vehicle MAK throttle actuator position (i.e., position of throttle actuator 280), Test Vehicle MAK steering actuator position (i.e., position of steering actuator 200, not steering wheel position), and Test Vehicle steering wheel position. The Test Vehicle Brake application onset (initiation) is also sensed and recorded by the DAK and occurs when the brake actuator 270 has applied a configurable preset amount of force to the brake pedal.

In some embodiments, ARTS DAKs are capable of actuating vehicle control points in a Test Vehicle 10, including the vehicle brake, throttle, steering, gearing/transmission, and emergency brake. The ARTS DAK may be capable of actuating a control point in a Test Vehicle 10 at a configurable actuation rate (e.g. X mm/sec or X degrees/sec or time for travel over full range of motion). In some embodiments, ARTS DAKs are also capable of controlling the speeds, accelerations, brake forces, and other controls of Test Vehicles 10 at configurable rates.

In some embodiments, ARTS DAKs are capable of actuating control points in a Test Vehicle according to a configurable profile over time. Additionally, in some embodiments, DAKs can control brake positions, brake forces, throttle positions, and steering wheel angles according to a profile over time with specifiable and recordable feedback sensing resolutions.

In some embodiments, if a Test Vehicle brake application time is specified and if configured to do so, then the DAK can begin brake application earlier based on a configurable reaction time, in anticipation of the time it takes for the brake pedal force to build up to the specified value at the specified brake application time. In some embodiments, the DAK can control Test Vehicle steering, accelerator, and brake smoothly, if needed, so that sudden movements do not occur. In some embodiments, the DAK is also designed to enable it to not interfere with built in crash avoidance interventions by sensing an audible, visual, or haptic warning or the non-interference is triggered by an event or state specified in the movement plan.

In some embodiments, ARTS DAKs are capable of autonomous operation of a DAK equipped test car along with other autonomous DAK equipped test cars with or without the presence of target robots. In some embodiments, ARTS DAKs are designed with external interfaces to audio, visual, and haptic information. For example, ARTS DAKs may be operably connected to audio, visual, and/or haptic sensors disposed around vehicle 10. In some embodiments, DAKs are capable of being configured to sense Test Vehicle visual and audible alerts. DAKs may also include digital and analog programmable trigger inputs to adapt haptic sensors for triggering haptic sensor alerts in DAKs.

In some embodiments, DAKs also support flexible integration with external devices and systems. For example, DAKs may include synchronizing inputs from external devices, such as a Video Box, to synchronize external device data with the data being collected by the DAK. In some embodiments, DAKs provide programmable trigger outputs in the Test Vehicle 10 to initiate actions, such as light an LED or set a timer. DAKs may be capable of being interfaced to the Test Vehicles CAN to send and receive data. For example, E-Box or other type of equipment box 310 includes a CAN port 312 that may be used to connect to the Test Vehicle's CAN. DAKs may use CAN for logging data from the test vehicles for additional logging information that may be used in post test evaluations.

Common Target Robot (TR) Instrumentation & Controls

A Target Robot ("TR") 100 is an ARTS robotic unit designed to carry a soft replica of a target. This target may be a vehicle, pedestrian, or cyclist. As noted above, TRVs are those TRs that participate in ARTS and that simulate other vehicles into which test vehicles 12 can safely collide. TRPs are those TRs that participate in ARTS and that simulate pedestrians into which test vehicles 12 can safely collide. TRCs are those TRs that participate in ARTS and that simulate cyclists into which test vehicles can safely collide. Other targets which participate in ARTS which provide a means into which test vehicles can safely collide also are possible. These TRs have common instrumentations & controls, as described below.

In some embodiments, the TRs have multiple control modes. Example modes of control for the TRs in some embodiments include:

1. Tele-operation mode: Users directly control movements via an HMI. Users may be remote from the TRS. In some embodiments, this mode is useful for TR re-positioning and as a means for course layout.

2. Autonomous Independent Movement mode: TRs operate according to their specified movement plans and without deviation (barring human override).

3. Autonomous Coordinated Movement mode: TRs operate according to their specified movement plan and coordinated collision plans and will dynamically deviate from the movement plan based on dynamic location and other dynamic information from a participating RU in order to arrive at coordinated collision points, rendezvous points, coordinated speeds, coordinated headways, or other coordinated relative movement actions.

Common RU Instrumentation & Controls as well as Common RU Movement Planning are embodied in TRs. In addition to such common functions, additional TR specific capabilities are also provided and described here.

In some embodiments, ARTS TRs are capable of fully autonomous operation. In some embodiments, TR autonomous sequences are capable of being initiated and terminated by operators. In some embodiments, TRs are also capable of tele-operation. When the TR is configured for operation in autonomous mode, then tele-operated mode is configurably able to be automatically disabled. When the TR is configured for operation in tele-operated mode, then autonomous mode is configurably able to be automatically disabled. In some embodiments, the TRs are designed to include a contingency means for manually controlling TR movement in the event of a COMS failure.

Figure 5:
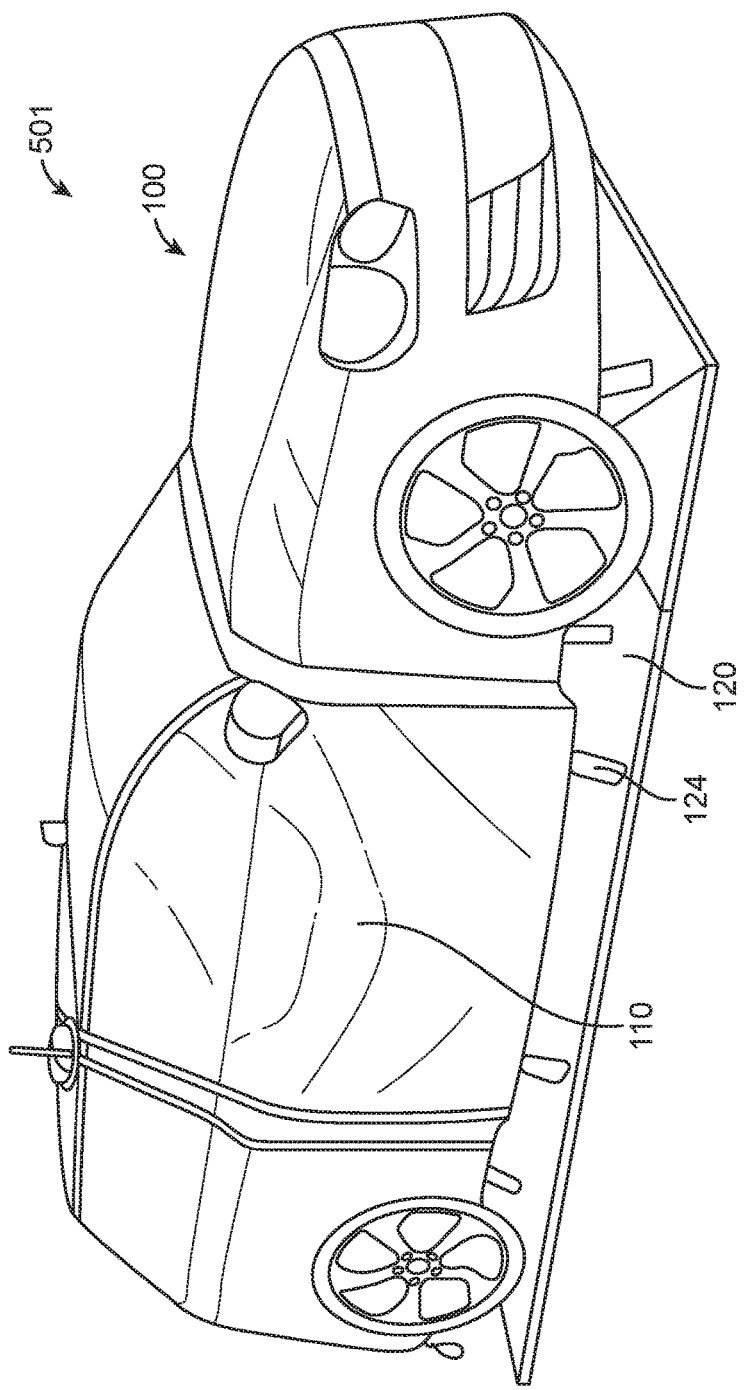
FIG. 5 shows a perspective view of a target robot vehicle according to some embodiments.
Figure 18:
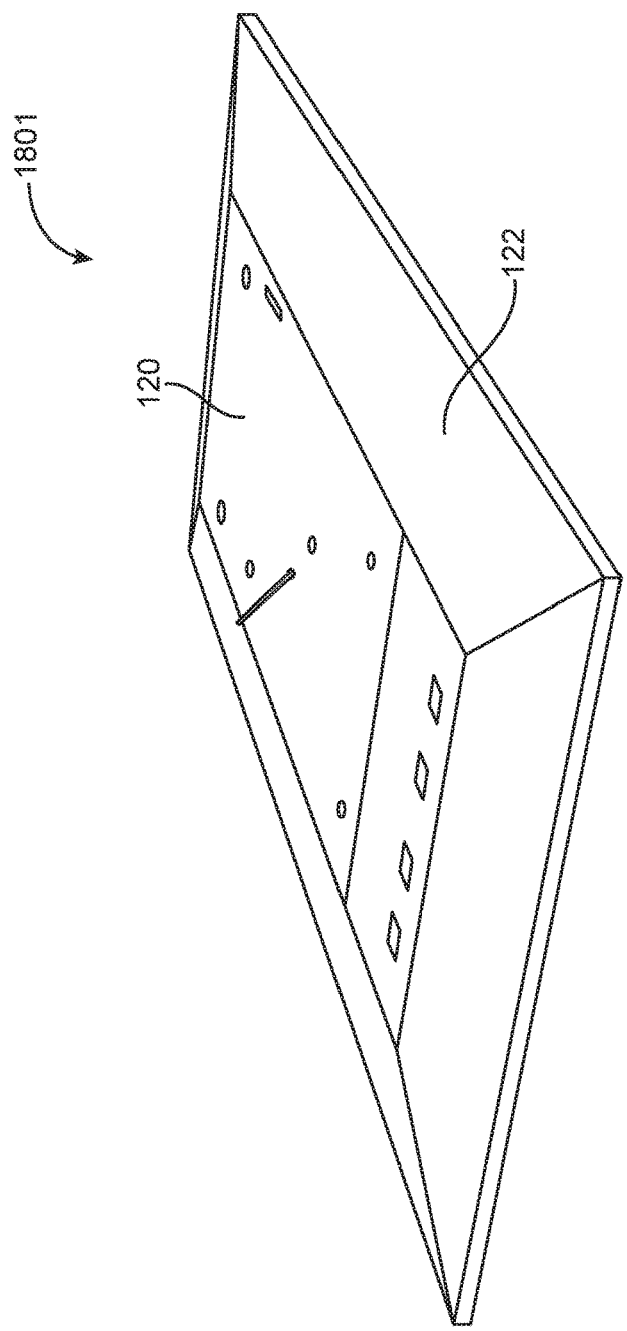
FIG. 18 shows a perspective view of a target robot platform according to some embodiments.
Figure 19:
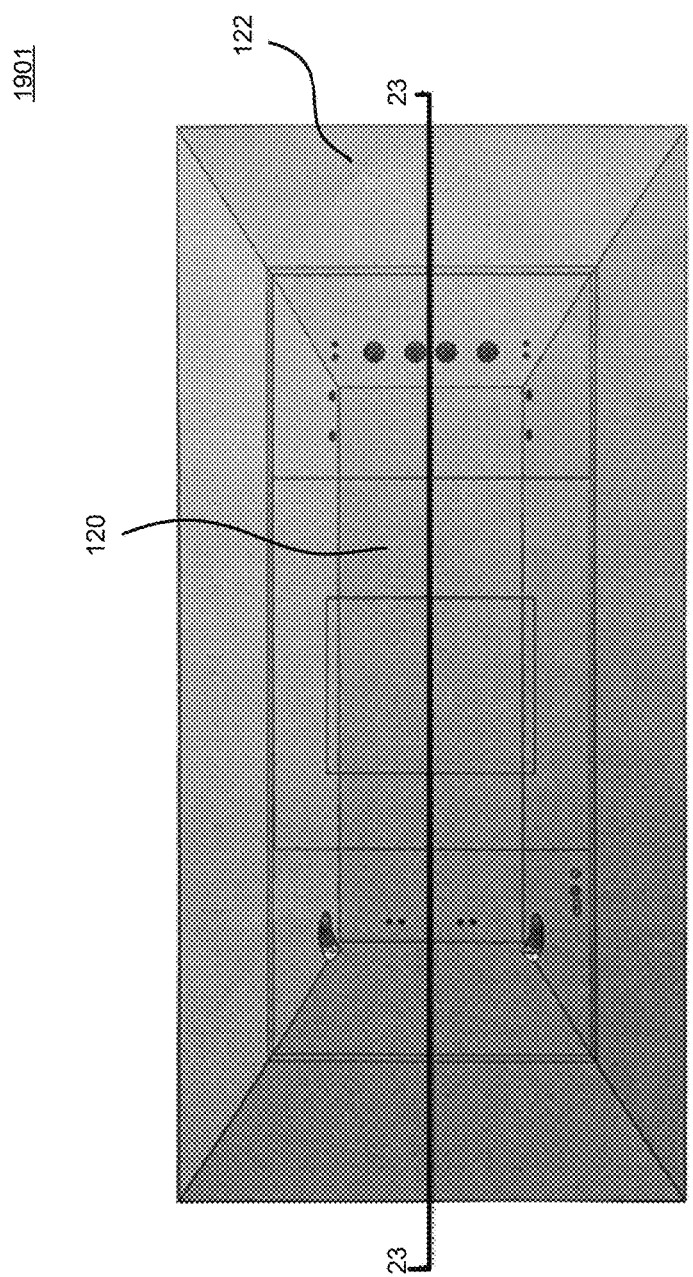
FIG. 19 shows a top view of a target robot platform according to some embodiments.

In some embodiments, TRs 100, such as TRV 501 or TRV 601, include a soft target 110 and a platform 120, as shown, for example, in FIGS. 5 and 6. While soft target 110 is shown as a vehicle in FIGS. 5 and 6, soft target 110 may imitate any type of target robot (e.g., pedestrian, cyclist, etc.). Soft target 110 is made of a material that is safe for test vehicle 12 to crash into. In some embodiments, platform 120 provides a surface for soft target to rest on, as well as the equipment (battery, electronics, wheels, etc.) that allows TRs 100 to move. TRs 100 support the ability to carry soft target 110. For example, as shown in FIGS. 18 and 19, TRs 100 provide attachments 124 for a soft target 100. For example, attachments 124 may comprise a hole or loop configured to receive a strap of soft target 110. TRs 100 are designed to exhibit motions as close as possible to soft target 110 types they carry (e.g., vehicles, pedestrians, and cyclists). For example, TRs 100 are able to travel at speeds and accelerations similar to their soft target 110 type, and are able to traverse a path similar to their soft target 110 type.

The TR platform 120 is designed for operation and run-over capability by Test Vehicles 12. In some embodiments, as shown, for example, in portions 1801, 1901, 2001, and 2001 of TR platforms 120 in FIGS. 18-21, the TR platform 120 has sloping sides 122 with corners shaped such that collisions and run-overs can occur at these sides 122. In some embodiments, the TR may have 3 or more sides 122. In some embodiments, the TR platform's sloping sides 122 may be angled to facilitate a run-over (e.g. 5-10 degrees).

Figure 22:
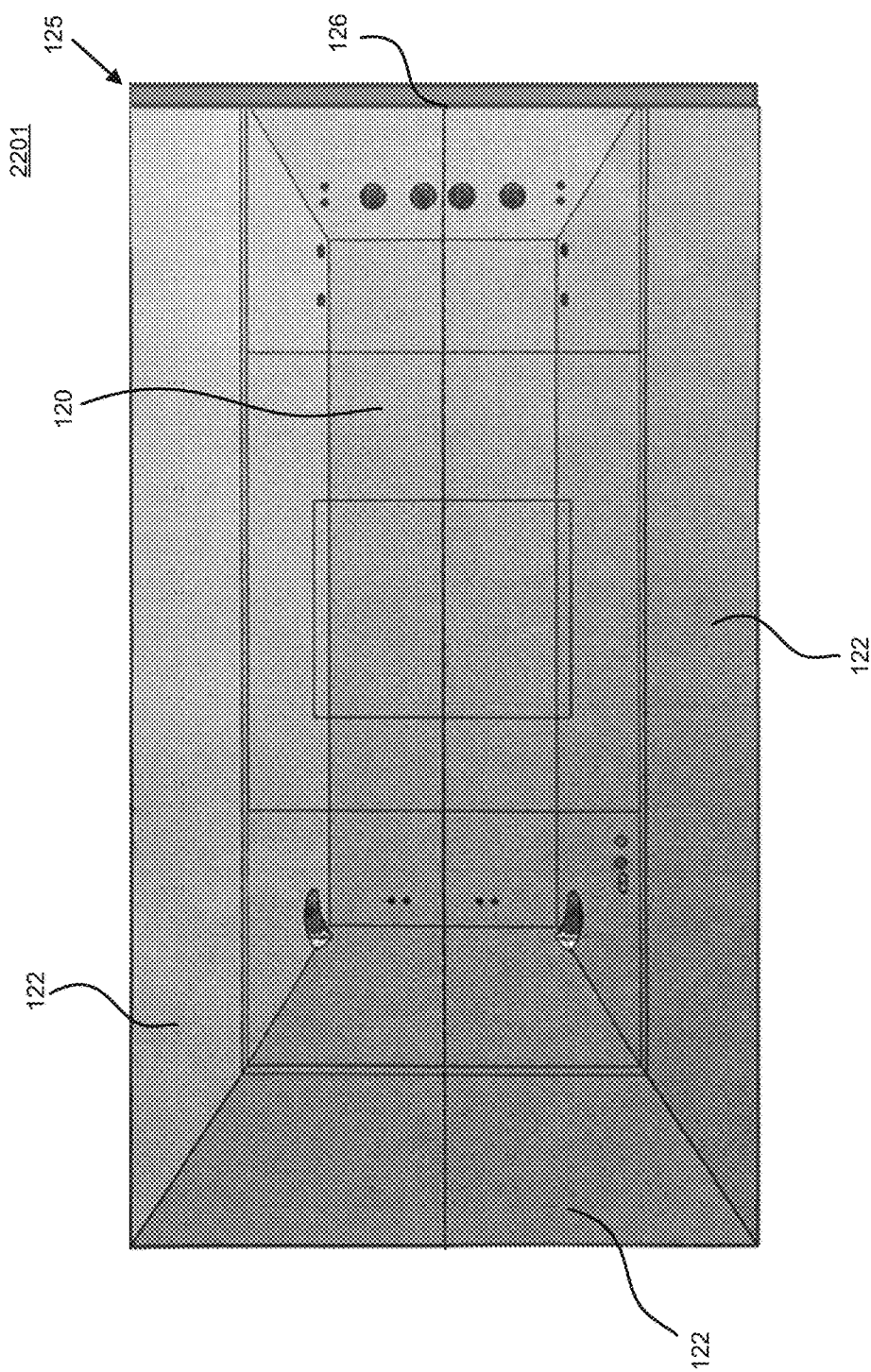
FIG. 22 shows a top view of a target robot platform according to some embodiments.

In some embodiments, as shown, for example, in portion 2201 of TR platform 120 in FIG. 22, a front side 125 of a TR may be 90 degrees (i.e., vertical) and contain a bumper 128 (e.g., a rubber bumper). Bumper 128 may be used to mitigate puncturing of Test Vehicle wheels when directed toward a Test Vehicle 12. Thus, a TR may have four sides, as an example (see FIG. 22), three of the sides 122 having 6 degree slopes, and a fourth side 125 (the front), having a 90 degree angle and rubber bumper 128 on it. In general, a TR may have a rubberized edge around its periphery to mitigate damaging the test vehicle's tire(s).

In some embodiments, TRs may receive different sides 122 for attachment to TR platform 120. For example, a TR supports the attachment of sides 122 which lengthen that side of the TR and offers a smaller sloping run-over. For example, if a lateral side 122 of a TR is 10 degrees, and it is desired to offer a 2 degree slope, the standard TR platform 120 may be augmented with an attached "wing" such that a vehicle 12 can run over the TR side 122 with a smaller slope. In some embodiments, the side of a TR platform 120 is designed with mounting holes and slots (not shown) such that when a mechanism of a side 122 is inserted into such holes and slots, the mechanism may be bolted down or held in place via a latch mechanism. The wings (i.e., sides 122 having different slope, for example) which serve as extension ramps to the TR platform 120 contain similar mechanisms which fit into these holes and slots for attachment to the TR platform 120.

In some embodiments, the TR platform 120 is rectangular. In some embodiments, TR platform 120 may be circular or oval in design. In some embodiments, TR platform 120 may embody a wavy design (i.e., the top surface of TR platform 120 is highest at the portion adjacent to sides 122 and lowest in a middle portion), thus simulating speed bumps.

Figure 20:
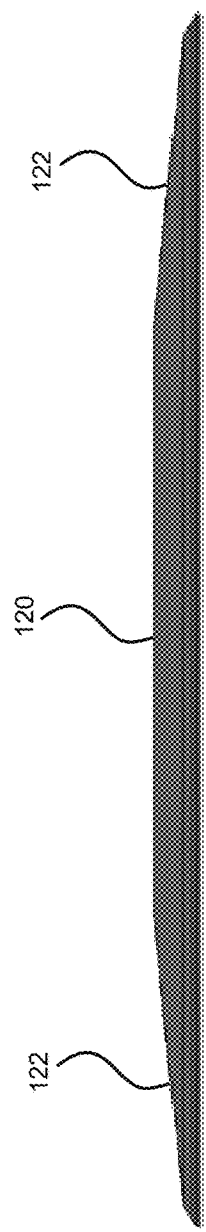
FIG. 20 shows a side view of a target robot platform according to some embodiments.
Figure 21:
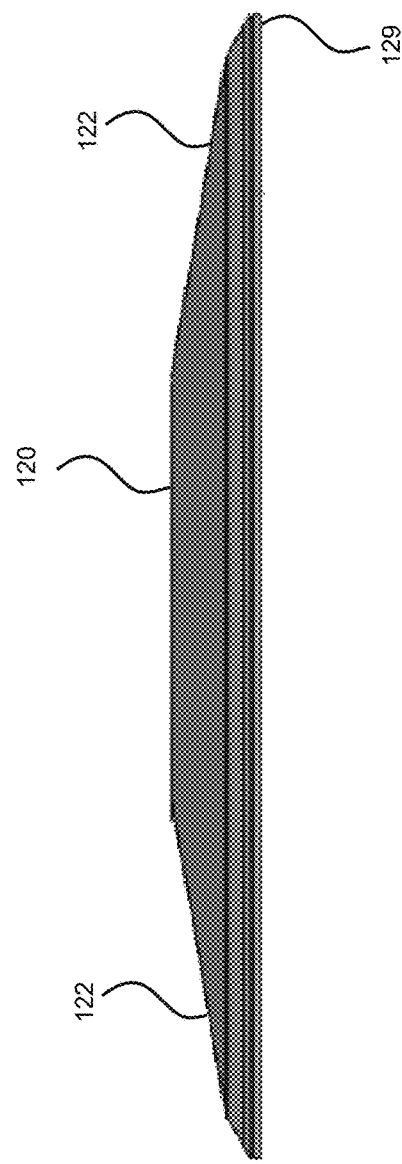
FIG. 21 shows a front view of a target robot platform according to some embodiments.

In some embodiments, the TR is configured with a ground clearance high enough to ensure that no equipment aside from TR wheels touch the ground on test tracks when operating in motion to execute a test procedure (e.g., 1 inch or 2 inch clearance on flat tracks), The TR platform heights are generally configured to have a low-profile height (e.g., 4-6 inches) (i.e., the height of TR platform 120 as shown in FIGS. 20 and 21) above the ground when TR platform 120 is dropped to the ground during a run-over.

Figure 23:
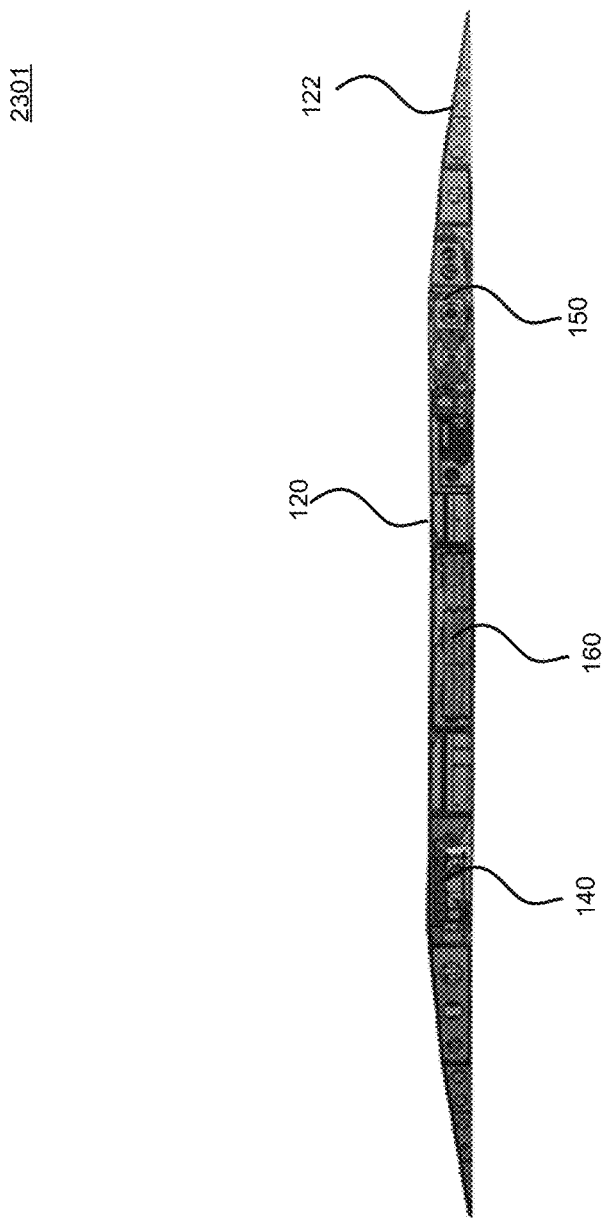
FIG. 23 shows a cross-sectional view of the target robot platform of FIG. 19 according to some embodiments.
Figure 24:
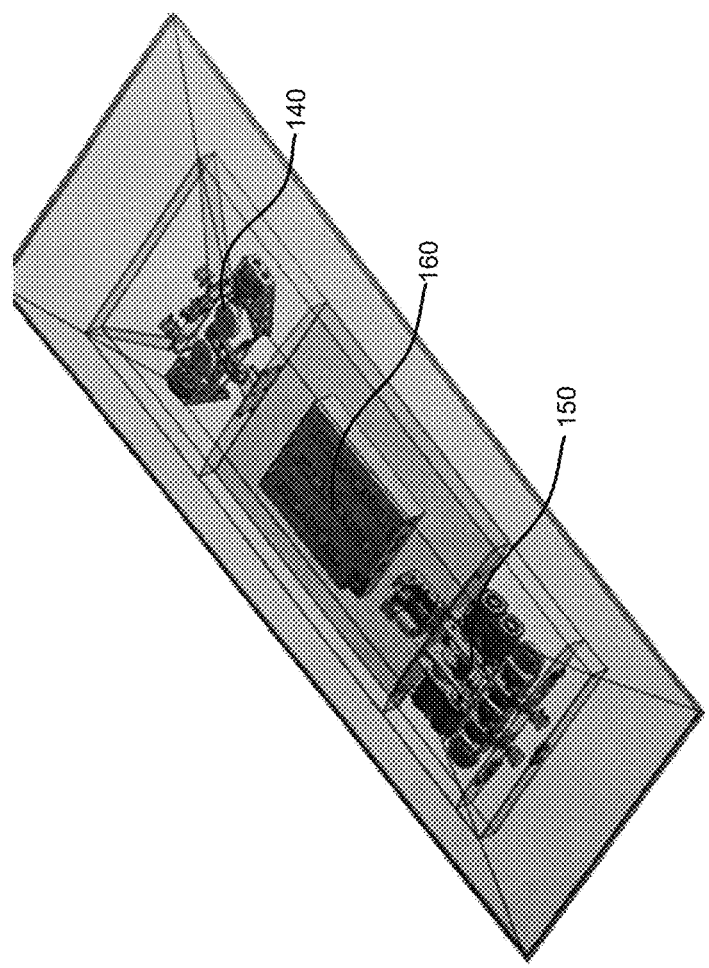
FIG. 24 shows an interior view of a target robot platform according to some embodiments.
Figure 25:
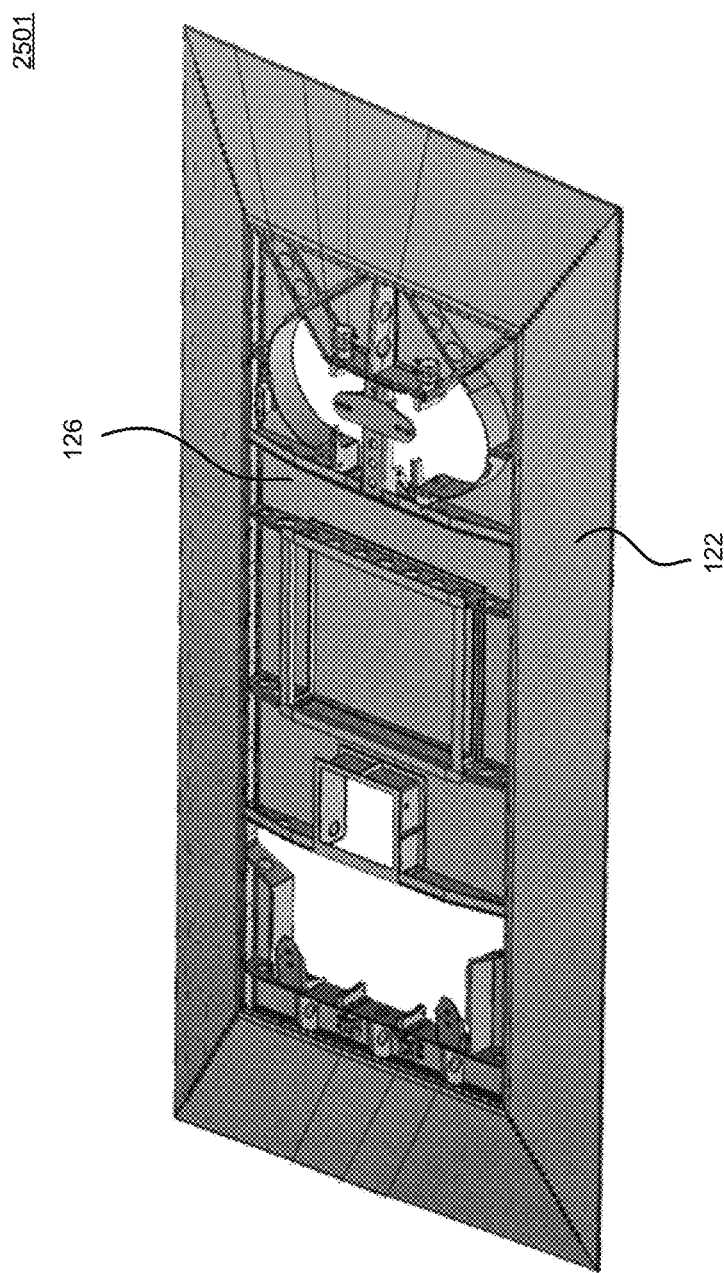
FIG. 25 shows an interior view of a target robot platform according to some embodiments.
Figure 26:
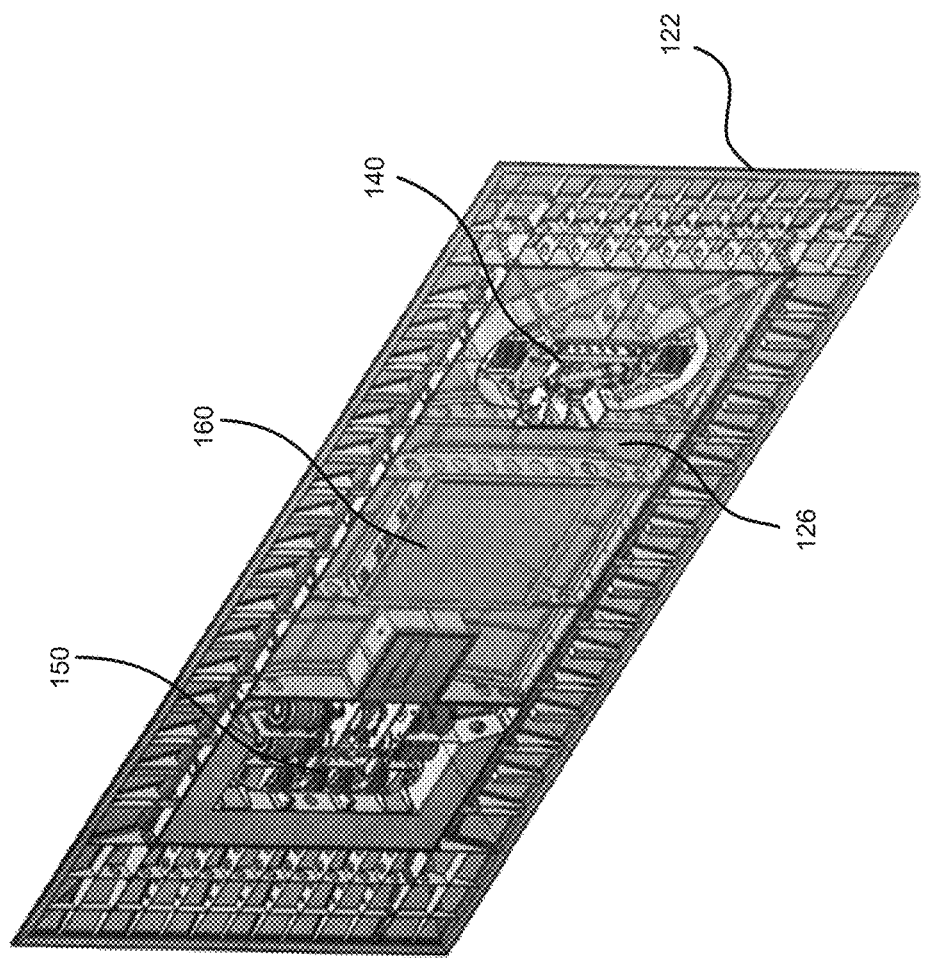
FIG. 26 shows a bottom perspective view of a target robot platform according to some embodiments.
Figure 27:
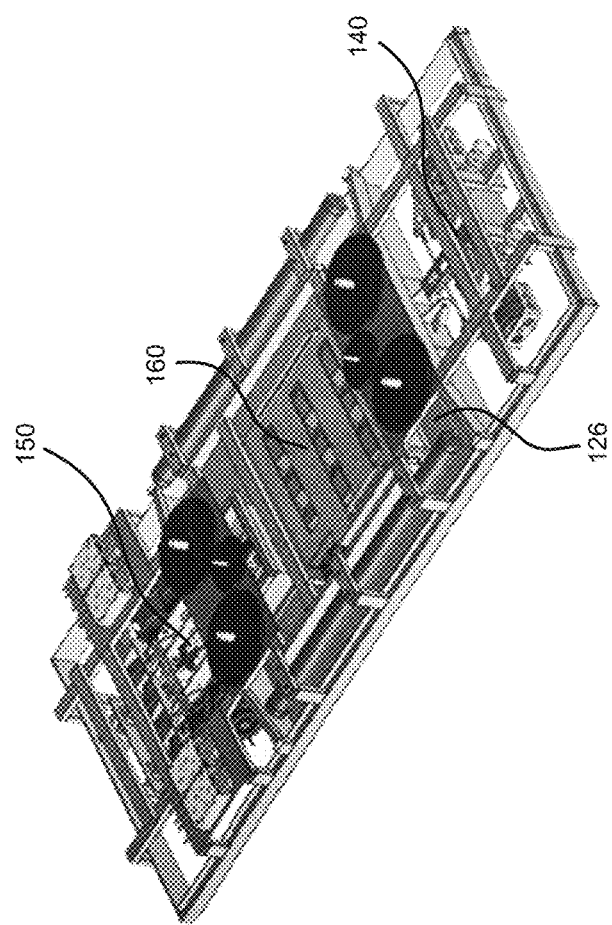
FIG. 27 shows an interior view of a target robot platform according to some embodiments.
Figure 28:
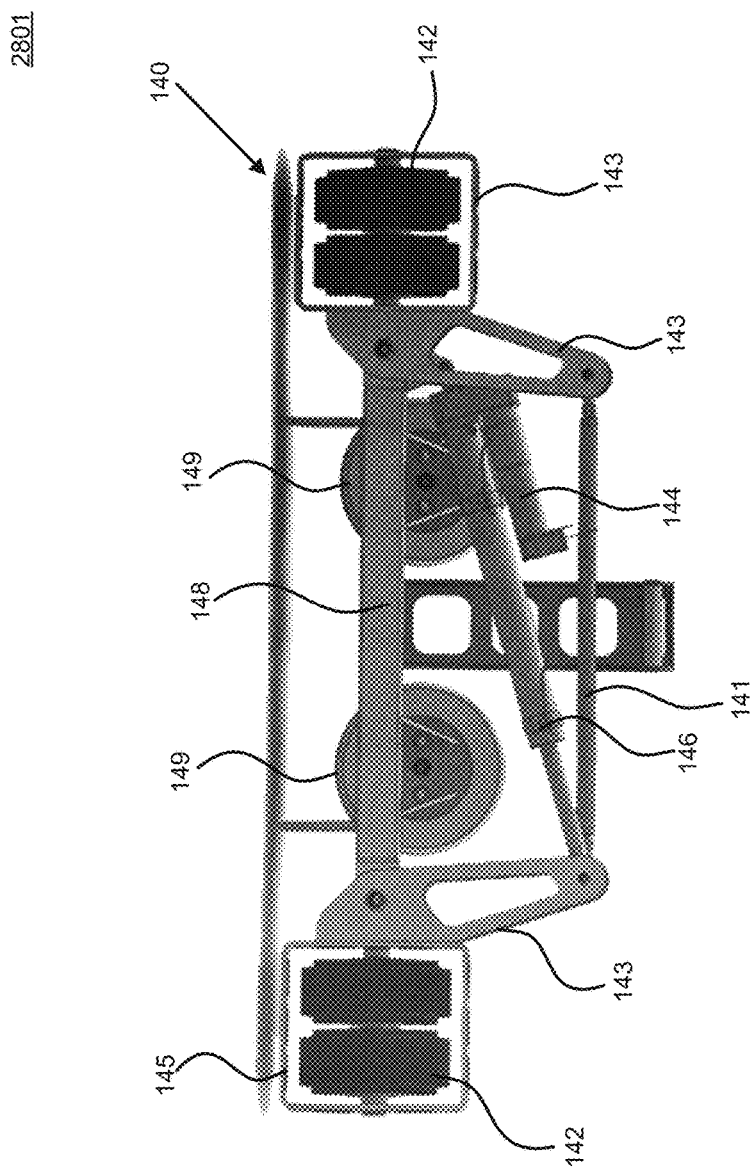
FIG. 28 shows a top view of a front drive system for a target robot platform according to some embodiments.

As shown in portions 2301, 2401, 2501, 2601, and 2701 of TR platform 120 in FIGS. 23-27, in some embodiments, TR platform 120 includes components within TR platform 120 and structure 126 to support those components. In some embodiments, structure 126 supports a front drive system 140, a rear drive system 150, and a battery 160, as well as electronic modules that allow for control of TR platform 120. FIG. 23 shows a cross-sectional view of front drive system 140, rear drive system 150, and battery 160 within TR platform 120. FIG. 24 shows front drive system 140, rear drive system 150, and battery 160 within TR platform 120 with TR platform 120 being transparent. In some embodiments, structure 126 is temporarily used to support front drive system 140, rear drive system 150, and battery 160 until platform 120 is ready. For example, FIG. 25 shows such a structure 126 that supports front drive system 140, rear drive system 150, and battery 160 until the components are inserted into platform 120. FIG. 26 shows front drive system 140, rear drive system 150, and battery 160 within platform 120 from the bottom of platform 120. FIG. 27 shows structure 126 and front drive system 140, rear drive system 150, and battery 160 without TR platform 120 and sides 122.

In some embodiments, the TR platforms 120 are designed such that springs, such as air springs 149, 159, may be used to compress the TR platform 120 to the ground during a run-over. In some embodiments, the TR platform 120 pops back up after a run-over. Because this can lead to bottoming out of Test Vehicles, an alternate TR platform 120 design in some embodiments includes a drop-down mechanism whereby the TR platform 120 drops down and stays down during and after a run-over. A manual or automatic lift mechanism built into or external to the TR raises the platform to its run height thereafter. The TR platform 120 heights are generally configured to have a low-profile height (e.g. 4-6 inches) above the ground when its shell is dropped to the ground during a run-over. The TR platform 120 may have a "ground edge" 129 around the bottom of the platform 120 (i.e., the edge 129 of the TR platform 120 touching the ground between the ground and sloping sides 122, may be 90 degrees or less, may be flat or rounded), as shown, for example, in FIG. 21.

In some embodiments, TR platforms 120 have a robotically controlled adaptable ground clearance adjustment capability (i.e., raised platform transport mode). In some embodiments, TR platforms 120 are capable of being controlled to raise its ground clearance high enough to clear incline and decline transitions that may exist on a test track or test location. In some embodiments, the TR platforms 120 are capable of being controlled to lower its ground clearance from a raised ground clearance state for transport to a lowered ground clearance for operating in motion to execute a test procedure. In some embodiments, the TR platforms 120 are able to be configured with a maximum speed limit such that it cannot operate faster than this speed limit when in raised platform transport mode. In some embodiments, the TR platforms 120 are able to be configured such that it cannot be raised or lowered when the TR is in motion (i.e., TR platform 120 must be stopped when raising or lowering the platform 120).

In some embodiments, these capabilities (i.e., the drop down and rise up mechanisms) are provided via use of inflatable air bags, such as air springs 149, 159. In some embodiments, inflatable air bags are placed within the TR platform 120 at different points. For example, a TR platform 120 may have an air bag on each of the four corners of a TR platform 120. In some embodiments, as shown in FIGS. 28-31, the air bags, such as air springs, 149, 159, may be provided with front drive system 140 and rear drive system 150, respectively.

These air bags may be inflated to a specific height with air pressure and position sensors that are able to provide feedback to indicate a specific height. Thus, when fully deflated, the TR 100 may rest on the ground. Then, for an operational height, the air bags may be inflated to a specified pressure or position (e.g., one inch above the ground). To further raise it for raised platform transport mode, the air bags may be inflated to another level (e.g., two to three inches above the ground). Manual or automatic latches or ratcheting mechanisms may also be used to lock the TR platform at a specified position.

TRs 100 are designed to minimize damage to itself and other vehicles. TRs are able to survive being run-over by a test vehicle traveling at highway speeds (e.g., 55 mph) having high-end vehicle weights (e.g. 7,500 pounds). HD TRs are those TRs designed for being run-over by a test vehicle embodying a tractor trailer (e.g., weighing 80,000 pounds or less). TRs 100 include a breakaway antenna system on the target robot such that the antennas and their connections break away from the target robot platform 120 during a collision.

In some embodiments, TRs 100 also provide interfaces to control electronics and mechanical components external to the TR platform 120, such as portions of soft target 110 (e.g., control of brake lights, swinging pedestrian arms, or rotating foam wheels). These interfaces may include breakaway electrical interfaces, wireless interfaces, or other types of interfaces.

Figure 29:
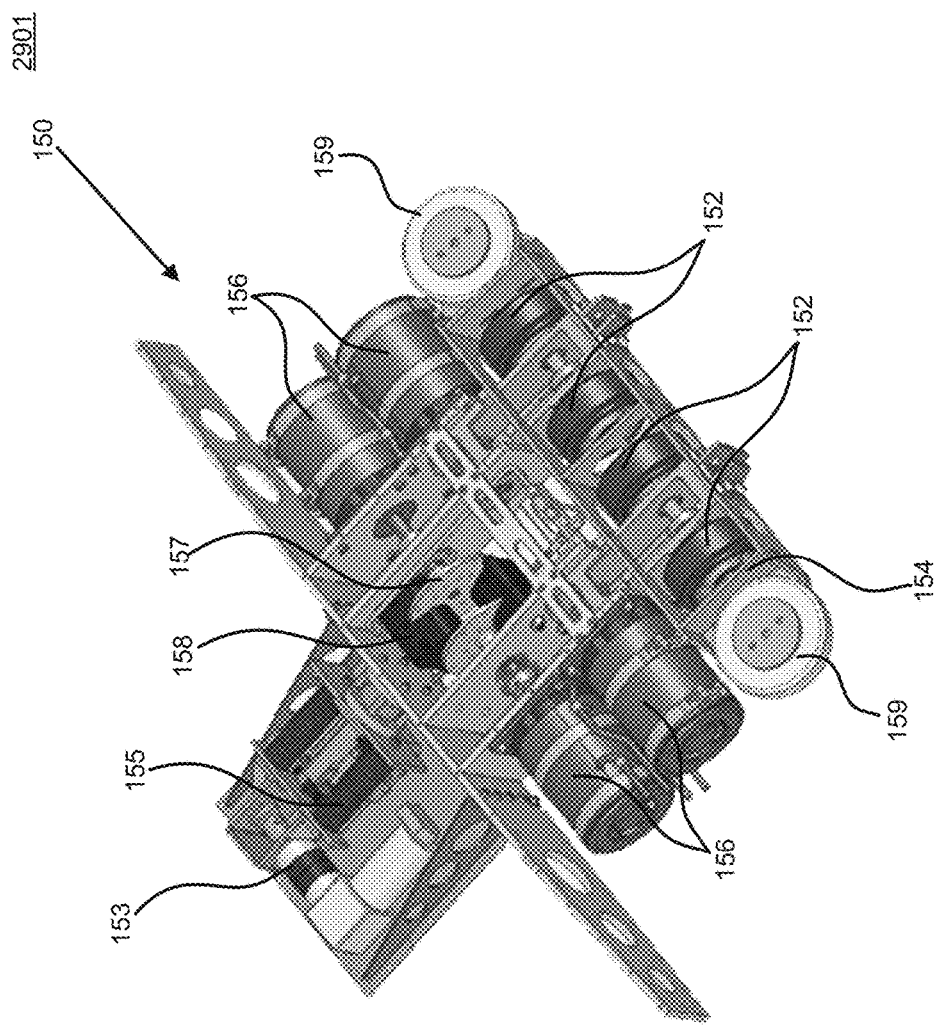
FIG. 29 shows a top perspective view of a rear drive system for a target robot platform according to some embodiments.
Figure 30:
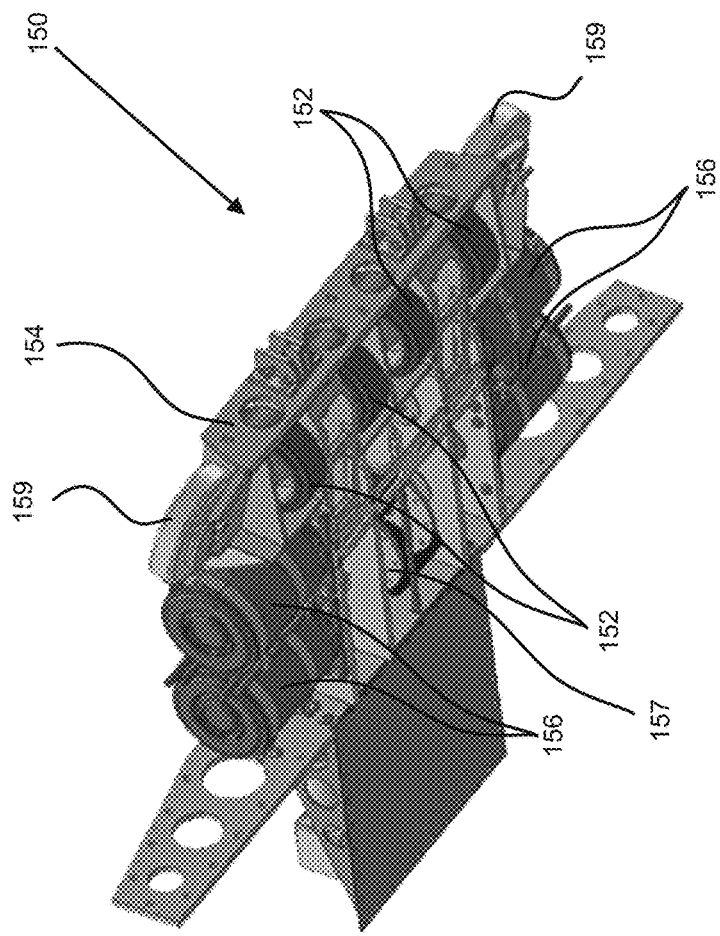
FIG. 30 shows a bottom perspective view of a rear drive system for a target robot platform according to some embodiments.
Figure 31:
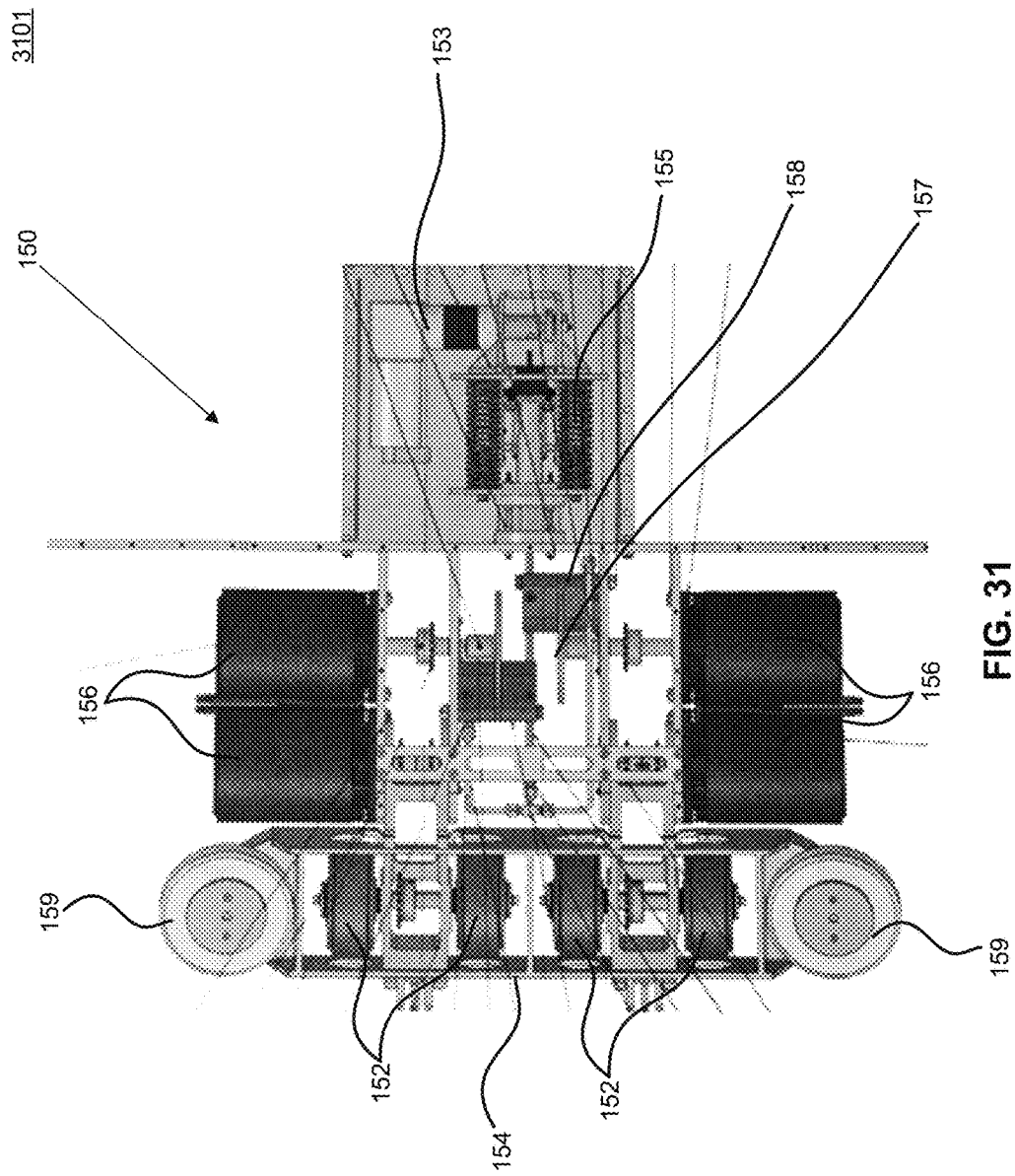
FIG. 31 shows a top view of a rear drive system for a target robot platform according to some embodiments.

In some embodiments, braking of TRs 100 may be achieved via electric braking, hydraulic braking, mechanical braking, or piezo-electric braking. For piezo-electric braking many small components are used to provide a total sum resistive force to brake and decelerate the TR 100. Redundant braking for TRs 100 is also employed. Here controlled braking is implemented using one of the mechanisms described above such as electric, mechanical, hydraulic, and piezo-electric braking. And then one or more redundant methods for braking may be employed. Thus, for example, a hydraulic brake is used for controlled braking, augmented with regenerative electric braking, and redundantly augmented with emergency mechanical braking. For example, as shown in FIGS. 29-31, rear drive system 150 may include brake pads 157 connected to motors 156. In some embodiments, brake calipers 158 are hydraulically operated and configured to brake wheels 152 via brake pads 157. In some embodiments, a hydraulic motor 153 controls brake calipers 158. In some embodiments, emergency braking is provided via springs 155. Springs 155 may be under tension with an emergency causing the tension in springs 155 to be released, thus causing brake calipers 158 to brake wheels 152 via brake pads 157.

The TR 100 is designed to be modular such that the front and rear drive systems 140, 150, may be replaced easily and swapped out for drive modules with different drive characteristics. Example front drive system 140 is shown in portion 2801 of a TR in FIG. 28 and example rear drive system 150 is shown in portions 2901, 3001, and 3101 of a TR in FIGS. 29-31. Front drive system 140 may include wheels 142 (e.g., two sets of two wheels 142) on opposite ends of an axle 148. Rear drive system 150 may include wheels 152 (e.g., four wheels 152) in a row along a rear portion of rear drive system 150. While two and four wheel drive options are most common, the TR design also supports one to eight wheel drive options.

In some embodiments, TR drive modules, such as front drive system 140, include Ackerman style steering and skid steering models as options. As shown, for example, in FIG. 28, front drive system 140 may provide Ackerman style steering. Ackerman steering involves linkages 143 in the steering designed to solve the problem of wheels on the inside and outside of a turn needing to trace out circles of a different radius. In some embodiments, linkages 143 extend from the portion of axle 148 adjacent to wheels 142 towards the center of rear drive system 150. Linkages 143 may be part of wheel assemblies 145. In some embodiments, a tie rod 141 connects the ends of linkages 143. In some embodiments, the Ackerman steering is powered by a motor 144. Motor 144 may cause piston 146 to extend and retract causing linkages 143 (and wheel assemblies 145 and wheels 142) to turn to the right and left. As discussed above, front drive system 140 may also include air springs 149 for controlling the height of TR platform 120.

In some embodiments, rear drive system 150, as shown in FIGS. 29-31, includes wheels 152 in rear wheel assembly 154. For example, four wheels 152 may be disposed in a row in rear wheel assembly 154. In some embodiments, air springs 159 may be disposed on each end of rear wheel assembly 154.

Another TR drive module option includes use of Mecanum wheels (a.k.a. Ilon wheel) to provide an omni-directional capability. Mecanum wheels can move a vehicle in any direction. It is a wheel with rollers attached to its circumference. The rollers typically have an axis of rotation at 45° to the plane of the wheel and at 45° to a line through the center of the roller parallel to the axis of rotation of the wheel. On the TR 100 in some embodiments, two or four Mecanum wheels can be placed on four corners (two on each side) of the TR 100 and operated in a forward direction, sideways direction, diagonal direction, or some fluid direction in between, to operate the TR 100 in an omni-directional fashion.

Another TR drive module option includes use of Omni wheels (a.k.a. poly wheels) to provide an omni-directional capability. Omni wheels are wheels with small discs around the circumference which are perpendicular to the turning direction. The wheel can be driven with full force, but will also slide laterally. On the TR 100 in some embodiments, two or four Omni wheels can be placed on four sides of the TR 100 and operated in a forward direction, sideways direction, diagonal direction, or some fluid direction in between, to operate the TR 100 in an omni-directional fashion. TRs 100 are designed such that their wheels do not sink into soft pavement.

Figure 32:
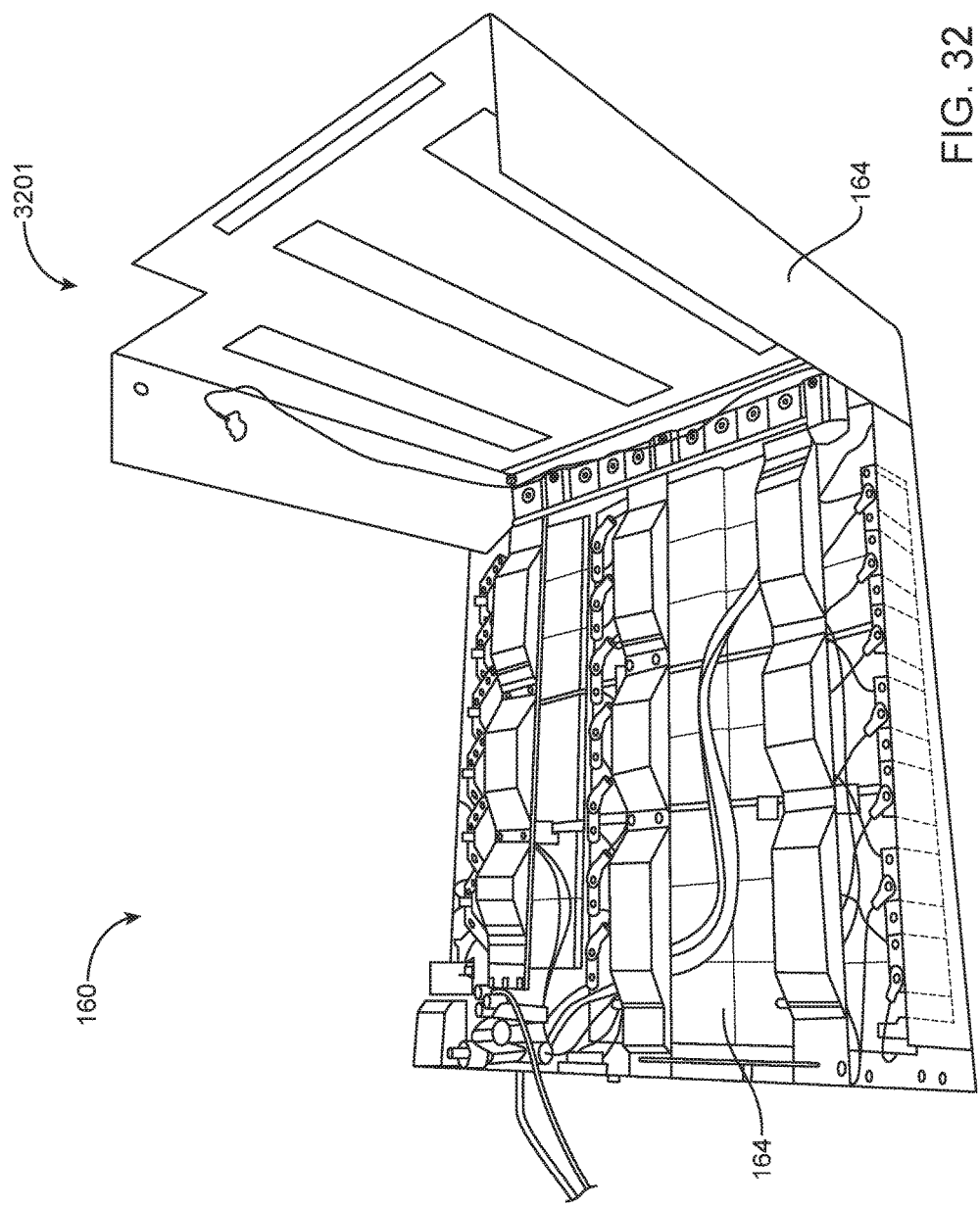
FIG. 32 shows a battery pack for a target robot platform according to some embodiments.

In some embodiments, battery 160, as shown, for example, in portion 3201 of a TR in FIG. 32, is provided in between rear drive system 150 and front drive system 140. In some embodiments, battery 160 includes a housing 162 and batteries 164 disposed within housing 162. In some embodiments, housing 162 pivots open to allow replacement of batteries 164. In some embodiments, TRs 100 are capable of running extended duration tests (e.g., up to four hours or more) before recharge. In some embodiments, batteries 164 are capable of being replaced in under sixty minutes.

In some embodiments, TRs 100 are capable of operating at temperature ranges suited for their operational environment (e.g., 20 to 105 degrees Fahrenheit). In some embodiments, the TRs 100 are designed to gracefully degrade performance (e.g., reducing max power output) to avoid damage to TR 100 equipment due to high internal temperatures. In some embodiments, the TRs 100 are designed to shut down components to avoid damage due to high internal temperatures.

Target Robot Vehicle (TRV) Instrumentation & Controls

Target Robot Vehicles (TRVs) are those target robots 100 that participate in ARTS and that simulate other vehicles into which test vehicles can safely collide. A Target Robot Vehicle (TRV) is an ARTS robotic unit designed to carry a soft replica of a vehicle. Common RU Instrumentation & Controls, Common TR Instrumentation & Controls, as well as Common RU Movement Planning are embodied in TRVs. In addition to such common capabilities, additional. TRV specific capabilities are also provided and described here.

In addition to an example embodiment of Common TR Instrumentation & Controls, as discussed above, TRVs may embody more specific needs. A TRV platform, for example, may have a platform footprint large enough to contain a soft target representative of an automobile, truck, or rear-end of a tractor trailer. In some embodiments, TRVs thus have a length (e.g. 12-15 feet) and a width (e.g. 4-6 feet) large enough to hold a soft target 110 representative of a vehicle or part of a vehicle, as shown, for example, in FIG. 5. A TRV is generally designed to exhibit motions as close as possible to a car or truck. In some embodiments, TRVs are capable of accelerations indicative of that of a vehicle (e.g. −1 g to +1 g) while carrying a soft target 110.

In some embodiments, TRVs are capable of steering its two front wheels for change of TRV direction and heading (i.e., as opposed to skid steering). For example, TRVs may employ Ackerman steering, as described above. In some embodiments, TRVs are also capable of a turn of radius indicative of a car (e.g., 25-30 feet). In some embodiments, TRVs also provide interfaces to control brake lights and other electrical and mechanical capabilities on the soft target 110 it is carrying or generally atop of its platform 120.

Driving a TRV at highway speeds (e.g. 55-65 mph) at automotive grade acceleration rates (e.g. 0-55 in 8 seconds or less) with soft target weights (e.g. 230 lbs), soft target drag coefficients (e.g. 0.4), and soft target cross-sectional areas (e.g. 30 sq-ft) requires significant drive power. Moreover, operating under these conditions in summer temperatures on test tracks (e.g., 105 degrees Fahrenheit) for a service day (e.g., 8 hours) requires drive power from motors that will not overheat. The TRV thus embodies a design that can handle such requirements. In some embodiments, brushless DC motors 156, as shown, for example, in FIGS. 29-31, with built-in fans and rugged encoders that provide a constant torque for a service day under such conditions are included in this design. The ability also to change out the shaft and have long and short shaft versions of motors is important to provide flexibility in how to mount the motors and how many wheels can be used per motor.

In some embodiments, the TRV is designed to be modular such that the front drive system 140 and rear drive system 150 may be replaced easily and swapped out for drive modules with different drive characteristics. The steering of a TRV generally embodies an Ackerman steering model to provide steering capabilities reflective of actual vehicles.

However, skid steering designs may also be leveraged. In some embodiments, modular designs also include front drive system 140 and rear drive system 150 that are the same to facilitate simpler manufacture as well as to enable the TRV to operate in a forward direction as it does a reverse direction.

It should be noted, that the TRV is in essence a low-profile unmanned ground vehicle platform that is capable of being run over by a wheeled vehicle (e.g., vehicle 12), capable of high speeds, and capable of carrying payloads. An example embodiment may include the following features:

An robotic unmanned ground vehicle platform (capable of tele-operated, autonomous, or semi-autonomous modes).

Low-profile:
  Of a height enabling run-over by a wheeled vehicle platform (e.g., 4-6 inches).
  With wheel diameters of a certain diameter range (e.g., 2-3 inches).
Rugged enough to be run over by a wheeled vehicle platform of a certain weight range.
Powerful enough to carry a payload of a certain weight range (e.g., 230 lbs).
Capable of operating up to high speeds (e.g., 55-65 mph).
Capable of carrying payloads with a platform of a specified width and length footprint (4-6 feet×12-15 feet).
Sloped sides to facilitate run-over.
Low enough to ground to facilitate run-over (0.5-1.5 inches).

While TRV has primarily been discussed as being used for carrying soft target 110, TRV may be used for other purposes as well. For example, TRV may be used a mobile platform for a low-profile camera. As an additional example, TRV may be used to carry other heavy payloads (e.g., carrying pallets).

Centralized Planning & Data Collection

The ARTS provides a means for storing and managing test plans, configurations, and test results. ARTS also provides system-wide coordination, dispatch, and monitoring. All said functions are system-wide functions, not specific to any robot, and thusly are typically embodied on trackside servers. The Command, Control and Intelligence (C2I) server is provided for each ARTS test environment.

One or more C2I Servers may serve one or more ARTS test locations. Each C2I

Server provides services for test planners, test directors, and test data analysts for their respective track. Data logs may be stored in a simple and easy to import format (e.g. comma delimited formats).

ARTS C2I Servers store movement plan configurations. Movement plan configurations include movement plan identifiers, pre-planned routes, parameterized conditions, movement actions, and test-specific configurations.

ARTS C2I Servers also store RU test results in a persistent store to protect against data loss. Test results include a movement plan identifier, movement plan start and end timestamps, timestamps for each logged data element, test results logged at a configured frequency (e.g. 10 or 100 Hz), positions logged during movement, headings logged during movement, speeds logged during movement, accelerations logged during movement, roll and pitch, yaw rate, and other RU state information logged over time. Test results may also include recorded audio, visual, and haptic warning events. Test results may also include health and status information such as battery condition, internal temperatures, error codes, positioning system quality and accuracy, position signal loss and re-acquisition, collision times, collision locations, collisions points on an RU, and other exception information.

ARTS C2I servers also store RU calibration routines and information and RU configuration information.

ARTS C2I Servers run any system-wide processes not tied to a specific RUs control (e.g. system health and status monitoring, RU-independent information needed by HMIs).

Emergency Stop (E-Stop) System

The ARTS E-stop system provides the capability to shut down ARTS RUs. ARTS

RUs thus are capable of being equipped with safe cut-off. Here in this E-Stop system description, the term TR applies to TRs in general as well as to TRVs. Here in this E-Stop system description, the term RU applies to DAKs and TRs in general as well as any robot under ARTS control.

ARTS RU drive power is capable of fail-safe and controlled cut-off. An ARTS RU is capable of fail-safe and controlled emergency braking. Any RU high source power (e.g. batteries to power a drive system) is capable of fail-safe and controlled cut-off. Any RU steering power is capable of controlled cut-off.

ARTS is capable of being placed into safe and operational states.

Disable & Enable Motive Power

ARTS is capable of entering a disable motive power (DMP) state. The DMP action triggers a fail-safe motive power state on the RUs under control. A fail-safe motive power state on an RU results in fail-safe loss of power applied to the drive system. On a TR, the drive system includes the motors (in order to prevent run away robot motive power). A fail-safe motive power state on an RU results in fail-safe application of emergency braking.

In some embodiments, an RU may be optionally configured such that the DMP action triggers only safe motor stop state (distinguished from fail-safe state) on the RU under control. A safe motor stop state on an RU results in loss of power applied to the drive system (e.g. throttle on a DAK) and application of controlled braking.

ARTS is capable of entering an enable motive power (EMP) state. The EMP action triggers the enable motive power state on RUs under control. An enable motive power state on an RU results in power applied to the drive motors. An enable motive power state on an RU results in release of emergency braking.

In some embodiments, an RU may be optionally configured such that the EMP action trigger only results in power applied to the drive system (e.g. throttle control) and release of controlled braking.

Disable & Enable Source Power

ARTS is capable of entering a disable source power (DSP) state. The DSP action triggers a fail-safe source power cut-off state on the RUs under control (i.e. cut all power sources). A fail-safe source power state on an RU results in all of the same fail-safe states resulting from a DMP trigger. Additionally, a fail-safe source power state on an RU results in fail-safe loss of high source power applied to any components (in order to prevent power issues arising from high source power, or from any fires that could arise from high source power).

Optionally, an RU may be configured such that the DSP action only triggers a DMP action on the RUs under control.

ARTS is capable of entering an enable source power (ESP) state. The ESP action triggers the enable source power state on the RUs under control. The enable source power state on an RU results in all of the same states resulting from an EMP trigger. Additionally, an enable source power state on an RU results in re-engagement of high source power applied to any components.

Optionally, an RU may be configured such that the ESP action only triggers an EMP action on the RU under control.

Controlled Safe Stop

ARTS is capable of entering a controlled safe stop (CSS) state. A CSS route is able to be configured for an RU. A CSS route instructs the RU to either maintain a current programmed RU route or to take evasive avoidance action around other RUs on the track.

The CSS action triggers a controlled stop state on the RUs under control. A CSS state on an RU results in a controlled stop of robot speed under a configurable and safe deceleration rate. A CSS state on an RU also results in steering to maintain a CSS route while under motion. A CSS state on an RU results in a controlled stop of steering power once the RU stops motion.

Run & Pause Mode

ARTS is capable of entering a run robot (RR) state. The RR action triggers a run robot state on the RUs under control. An RR state on an RU results in allowing robotic control of forward motion on the RU (e.g. driving of motors on a TR or control of throttle on a DAK). An RR state on an RU results in allowing robotic control of braking on the RU (e.g. braking of a TR or control of brakes on a DAK). An RR state on a TR results in allowing robotic control of steering on the RU.

ARTS is capable or pausing the robotic controls of an RU which takes it out of the RR state.

RU E-Stop Related Inputs

An ARTS RU has inputs dedicated to signaling EMP/DMP and ESP/DSP, collectively enable/disable, status.

In an example embodiment, the following RU inputs apply:

Common:
  An RU has an enable/disable input for indicating operational/failed system component (e.g. computing, software, sensor) status.
  An RU has an enable/disable input for indicating manual operator intervened latch/unlatch status.

EMP/DMP:
  An RU has an EMP/DMP input for indicating RSCU EMP/DMP status.

ESP/DSP:
  An RU has an ESP/DSP input for indicating RSCU ESP/DSP status.

Robot-specific:
  A TR has an enable/disable input for indicating run-over (disable) or not run-over (enable) status.

In an example embodiment, the following RU E-stop state rules apply:
  An RU allows an EMP state only if all common, robot-specific, and EMP/DMP enable/disable inputs are enabled.
  An RU induces a DMP state if any common, robot-specific, or EMP/DMP enable/disable inputs are disabled.
  An RU allows an ESP state only if all common, robot-specific, and ESP/DSP enable/disable inputs are enabled.
  An RU induces a DSP state if any common, robot-specific, or ESP/DSP enable/disable inputs are disabled.

Remote Safety Control Unit (RSCU) Basics

Remote Safety Control Units (RSCU) are the typically handheld remote safety control units that human operators use to trigger ARTS E-Stop actions.

An ARTS RSCU is configurable for the specific RUs it safety stops. One or more RUs are configurable for safety control by one or more RSCUs. Thus, there is a many to many safety control relation between RUs and RSCUS. An RU can be controlled by one or more RSCUs, and a RSCU can safety control one or more RUs. RUs under control by an RSCU are capable of being controlled by the RSCU at the very least within line of sight and from up to 1500 feet distance at a minimum.

An RU has the means for deterministically verifying that a particular RU is properly configured for control by a particular actively used RSCU, for example:
  The operator is capable of triggering the RU to communicate to the RSCUs it is controlled by and the RSCUs provide a confirmation indication to the operator.
  The operator is capable of triggering the RSCUs to communicate to the RUs they control, and the RUs provide a confirmation indication to the operator.
  The RSCUs are not allowed to communicate stop or confirmation requests to RUs that they are not configured to control.
  The RUs are not allowed to communicate confirmation requests to RSCUs by which they are not configured to be controlled.
  In the event that an RU is not configured for operation with any actively used RSCU, the RU does not engage its safety-critical actuation mechanisms.

ARTS employs multifaceted safety checks both before and during RU movement. Each RU performs continuous safety self-assessment via checking health and status monitoring of instrumentation and communication as well as reasonableness checks of position, orientation, speed, turning angles, and actuator movement rates and limits. In addition, multiple Remote Safety Control Units (RSCU) maintain continuous communications amongst RUs to allow intervention of testing sessions.

RSCU Switches

Additional example embodiments include:
  An ARTS RSCU provides an enable/disable motive power (EDMP) switch to trigger EMP/DMP actions respectively.
  An ARTS RSCU provides an enable/disable source power (EDSP) switch to trigger ESP/DSP actions respectively.
  An ARTS RSCU provides a run/pause (RP) switch to trigger RR/CSS actions respectively.
  An ARTS RSCU provides a dead man (DM) switch. A dead man switch is designed such that the RU will only allow movement if the operator actively holds the switch in a designated safe position and orientation. The RSCU is configurable such that a DM switch function can be disabled or enabled. The RSCU is configurable such that, if enabled, the DM switch can function as either an EDMP, EDSP, or RP switch.

RSCU Lights

An ARTS RSCU has lighted indicators of its state. These indicators include display its power on/off state, unit switch state, communications channel availability state, and whether or not it is connected to an RU.

During configuration, a RSCU displays confirmation status when connecting to RUs (e.g. can reuse the connected state display to blink a specific number of times when connecting to a specific RU). RSCU lights are visible in direct sunlight.

E-Stop COMS

ARTS E-Stop has diverse redundant communication channels. A fail-safe communications channel provides fail-safe communications between RSCUs and RUs. A standard communications channel provides standard communications between RSCU, RU, HMI, C2I, and other ARTS devices.

Enable/disable motive power, enable/disable source power, run/pause communications, configuration messages (e.g. configuration via HMI, confirmation messages with RUs), and status and coordination messages (e.g. RSCU status to a C2I server) may occur over either communications channel. However, run/pause, configuration, status, and coordination messages may be configured for no communication over fail-safe communications channels in order to reserve those channels for the most safety-critical messaging of enable/disable messages. Thus enable/disable motive and source power messages may be the only messages communicated over fail-safe communications channels and standard communications channels redundantly.

E-Stop Rules

The ARTS system embodies safe shut-down rules for shutting down RUs. An RU is capable of automatic shut-down if it leaves a designated zone before completion of a movement plan. An RU also has an independent safety watchdog checking mechanism in each RU which checks for unsafe states of robot operation. These unsafe states and checking rules are configurably defined. RUs also have an independent safety watchdog checking mechanism which triggers a safe state in the event of a failed system component (e.g. computing, software, sensor). ARTS has the ability to safely stop RUs in the event of specified testing errors, anomalies, loss of communication, and other fault conditions identified.

ARTS embodies automatic stop rules for shutting down RUs operating outside of defined operation areas. ARTS can be configured to automatically stop RUs from operating outside of defined operation areas when the RUs are in autonomous mode. ARTS also can be configured to automatically stop RUs from tele-operation outside of defined operation areas. ARTS can be configured to allow RUs to be tele-operated outside of defined operation areas with a configurably specified maximum speed (e.g. 5 mph, walking or jogging speed).

Fail-Safe Shut Down

An RU can contain components which receives a periodic pulse or time varying signature. If any pulse is skipped or any bit in the signature is corrupted, dropped, or delayed, the RU can fail-safe. A downstream component can monitor this signal or signature and is designed such that if any single point of failure occurs, it will result in a fail-safe shutdown. For example, a time-varying signature may be produced and compared redundantly in hardware. If any one bit in this signature is corrupted, it will output a corrupted pulse train to an RC circuit. If this pulse train misses any single bit, the RC signal will fail to energize a fail-safe relay. The fail-safe relay can be selected such that any loss of power of failure in the relay itself results in a fail-safe state. Redundant signature generation, signature comparison, pulse monitoring, and safety relays can be employed as a matter of added safety.

A safety watchdog controller passively monitors the system for possible faults and errors. It generates a time varying signature as a function of the safety checks it performs. This signature can be generated a variety of ways. One way is to generate a bit in the signature as low or high depending on whether or not a check has failed or is ok. The checks can also each generate a different signature and these individual signatures can be combined and compressed into a single signature (e.g. via checksum of the different signatures). The final combined signature is the time varying signature from the safety watchdog controller.

The time varying signature can be generated from a safety watchdog controller. If the safety watchdog controller, when executing a configurable set of rules, fails any one of its rules, it can result in an incorrectly generated signature. The size of the signature (e.g. 128-bit or 1024-bits) can be selected to dictate the mean time between hazardous events (MTBHE) based on the likelihood a failure manifesting itself in this signature.

This signature can then be compared by a watchdog monitor which compares it against a known fixed signature it expects. If any one bit in the signature doesn't match, there is a failure. A varying exclusive OR over the two signatures can generate an odd even pulse stream. If any failure occurs, a resulting pulse fails to alternate. This variation in the alternating signal would mean a failure. This time varying pulse is fed into logic that looks for these pulses. If any pulse variation is missed and thus implies a failure, it would result in a fail-safe relay dropping and triggering the system to shut down.

Human Machine Interface (HMI)

In an example embodiment, ARTS provides a Human Machine Interface (HMI) allowing operators to configure, operate, monitor, and analyze the system and its RUs. The HMI runs on a wide variety of operating systems and platforms, inclusive of Windows, Mac OS X, Linux, iOS, Android, and other operating environments. The HMI also runs on a wide variety of hardware platforms, inclusive of workstation, desktop, laptop, tablet, smart phone, and other devices.

The HMI here may be a graphical user interface (GUI) presented on a laptop, desktop, tablet, or smart phone device. A series of Windows and screens collect different user interface functions typically composed of GUI buttons, drop-down menus, text fields, text areas, graphical trees, and other GUI widgets and display and control panels. Thus the HMI may be achieved via familiar GUI windows, panels, fields, and controls common on computing platforms such as Windows, Mac OS X, Linux, iPhone, iPad, iOS, Android, and other devices with user interfaces. Another part of the HMI is a joystick or controller that enables the user to tele-operate a TR.

Display Units & Time

The ARTS HMI allows for the definition of units of measurement for input and display according to either the metric or US/imperial systems. The HMI provides a simple means for rapid selection of either the metric or US/imperial system for data input and display on a particular screen.

The HMI provides a display of the current date, time, and system timestamp (incremented according to a configurable number of milliseconds) which can be configured to be disabled or activated.

Visual Map Interface

The ARTS HMI provides a visual map interface. The HMI provides a visual map interface with an optionally configured loaded image backdrop (e.g. image of a test track). The visual map interface is configurable to render designated defined routes. The visual map uniquely identifies individual displayed routes (e.g. route ID, color). The visual map interface is configurable to render designated RU real-time positions. The visual map interface uniquely visually identifies individual RUs (e.g. via color, RU ID, icon, and/or shape).

The visual map interface is configurable to render breadcrumbs of actual routes travelled by designated RUs. The HMI provides an interface for specifying generation of breadcrumbs during RU travel every configurable X units of time. The HMI also provides an interface for specifying generation of breadcrumbs during RU travel every configurable X units of distance travelled.

Route Creation & Editing

The ARTS HMI provides an interface for creating and editing routes. The HMI provides a visual map interface for creating new routes. The HMI provides an interface for specifying route identifiers and an interface for training of new routes based on a designated RUs movement. The HMI provides an interface for specifying generation of waypoints during training every X units of time, every X units of distance travelled, every X units of heading changed, and for specifying generation of waypoints during training based on a user-triggered input (e.g. mouse click on a button).

The HMI provides an interface for plotting new waypoints for a route using a visual map. The HMI provides an interface for moving waypoint positions on a visual map for a route. The HMI provides an interface for editing waypoint position values for a defined route. The HMI provides an interface for defining lane width for a defined route. The HMI provides an interface for specifying the number of times to traverse a route (default of 1 traversal, no repeats).

Movement Plan Creation & Editing

The HMI provides an interface for creating and editing movement plans. The HMI provides an interface for configuring movement plan identifiers, configuring movement actions, associating movement actions with movement plans, defining sequences of movement actions for movement plans, configuring parameterized conditions, associating parameterized conditions with movement actions, configuring available rules for combining how parameterized conditions trigger specific movement actions, and associating a defined route with a movement plan.

The HMI provides an interface for associating an RUs movement plan with other coordination dependent RU movement plans and routes (i.e. robot cannot run unless other coordinated robots are running the specified movement plans and routes).

Robotic Unit Configuration

The HMI provides an interface for configuring a designated RU. The HMI provides an interface for configuring RU height, width, and length dimensions, RU wheelbase, RU weight, RU position antenna location, and RU component network addresses.

The HMI provides an interface for configuring DAK audio and visual sensing parameters as well as for configuring inputs from provided sensors such as haptic sensors.

The HMI provides also an interface for configuring the dimensions of a virtual box tightly fitted over the 4 tires of a DAK Test Vehicle, with steering neutral, so that the tire position can be determined during testing.

Robotic Unit Calibration

The HMI provides an interface for calibrating a designated RU. The HMI provides an interface for calibrating DAK steering angles, braking position, braking force, throttle positions, and speed sensing ratios.

The HMI also provides an interface for calibrating TRV steering angles, braking, and speed sensing ratios.

The HMI provides an interface for calibrating RU speed controls, steering controls, orientation & heading sensors, and position sensors, speed sensors, and accelerometers.

The HMI provides an interface for calibrating DAK audio, visual, and haptic sensing.

Storing & Loading ARTS Information

The HMI provides an interface for loading and storing system information. The HMI provides an interface for loading and storing information of persist-able interest. Information of persist-able interest includes defined routes, movement plans, RU configurations, RU calibrations, and test results.

The HMI provides the capability for loading and storing information of persist-able interest on hardware locations of persist-able interest. Hardware locations of persist-able interest includes designated C2I servers, local user HMI machine storage, and designated RUs.

Robotic Unit Control & Monitoring

The HMI provides an interface for controlling and monitoring one or more RUs. The HMI provides an interface for configuring which RUs to control, for configuring which movement plans under which a designated RU should operate, for configuring which defined routes over which a designated RU operates.

The HMI provides an interface that verifies the validity of a combination of movement plans, for starting and stopping movement plan execution of a designated RU, and for starting and stopping movement plan execution on one or more designated RUs at the same time.

The HMI provides a display of the current date, time, and system timestamp.

The HMI provides an interface for configuring which RUs to monitor and which state values of an RU to monitor. A configurable RU state value to monitor is the position of an RU on a visual map. Other configurable RU state values to monitor include the heading of an RU, roll and pitch of an RU, the speed of an RU, the acceleration of an RU, the distance traveled by an RU since the start of its movement plan execution, TTC with another RU, the movement plan ID under which the RU is currently operating, and the route ID over which the RU is currently operating.

Relative values between one RU and one or more selected other RUs can also be configure for monitoring. These relative values include relative position, heading, orientation, speed, acceleration, relative positions between specified points on two RUs, and relative times to collision between specified points on two RUs.

The HMI also provides an interface that displays whether or not an RU can execute its movement plan or not based on the RUs validation of coordinated dependent movement plans and routes of other RUs.

HMI-Based E-Stop Functions

The HMI provides an interface for E-Stop functions. The HMI provides an interface for configuring RSCUs for E-stop control. This includes associating one or more RSCUs for E-stop control of one or more RUs, triggering a designated RU to attach to a designated RSCU, triggering a designated RSCU to attach to a designated RU, and displaying confirmations verifying associations between RSCUs and RUs.

The HMI provides an interface verifying that all RUs under movement control for an individual or coordinate movement plan are also under available and properly associated RSCU control. This includes verifying RUs under movement control are associated with RSCUs, verifying RUs under coordinated movement control (e.g. a test) are associated with RSCUs, verifying that any RSCUs associated with RUs in a test or under movement control are properly associated with those RUs, and verifying that any RSCUs associated with RUs in a test or under movement control are online and connected.

The HMI provides an interface for setting E-stop states. The HMI provides an interface to trigger specific E-stop states such as the disable motive power state, the disable source power state, the disable controlled safe stop state, the run robot state, and the pause robot state.

The HMI provides an interface for triggering E-stops states for individually designated RUs and for triggering E-stops states for a collection of designated RUs.

The HMI provides an interface for displaying E-stop status. This includes identifying which RSCUs are configured for E-stop control, identifying a designated RSCUs connectivity status, identifying a designated RSCUs switch state, and displaying associations between RSCUs and RUs.

The HMI provides an interface for disengaging/engaging a designated DAKs control points. This includes an interface for disengaging/engaging power for a designated DAKs throttle actuator for control, for disengaging/engaging power for a designated DAKs brake actuator for control, for disengaging/engaging power for a designated DAKs steering actuator for control, for disengaging/engaging power for a designated DAKs speed control (i.e. throttle and brake combined), and for disengaging/engaging power for a designated DAKs actuation control (i.e. throttle and brake and steering combined).

Robotic Unit Tele-Operation

The HMI provides an interface for teleoperation of designated RUs. The HMI provides any interfaces needed for configuring a designated RU for control by a designated interface (e.g. by joystick or screen-based control). The HMI provides an interface for switching between tele-operated mode or autonomous mode.

The HMI provides an interface for tele-operated control of a designated RU. The tele-operated control provides control of TRV steering and speed.

The tele-operated controls support at least line of sight operation with an effectiveness up at least 200 feet.

The tele-operated controls may provide other useful RU control functions as warranted (e.g. E-stop button, pause/run functions, traction power adjustments for uphill vs downhill vs flat operation).

The HMI provides an interface for configuring whether or not a designated RU can operate outside of a defined test area when in tele-operated mode. The HMI provides an interface displaying whether or not a designated RU can operate outside of a defined test area when in tele-operated mode.

The HMI provides an interface controlling and monitoring a designated TR or TRV ground clearance adjustment (e.g. for transporting the TR or TRV across connecting tracks). The HMI provides an interface for raising and lowering a designated TR or TRV ground clearance adjustment. The HMI provides an interface displaying status of a designated TR or TRV ground clearance adjustment.

Figure 33:
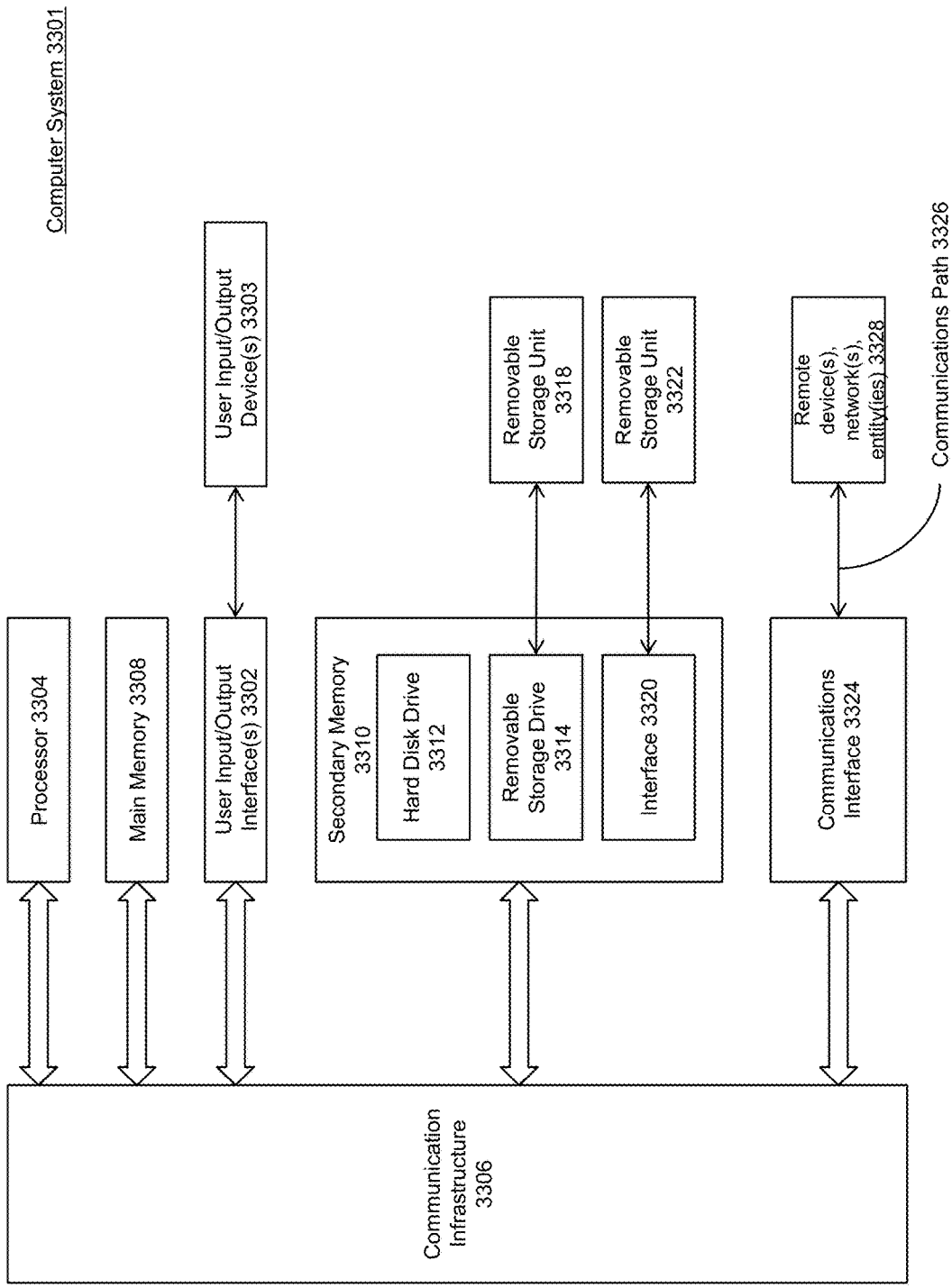
FIG. 33 shows an example computer system useful for implementing various embodiments.

Various embodiments can be implemented, for example, using one or more computer systems, such as computer system 3301 shown in FIG. 33. Computer system 3301 can be used, for example, to implement the fail-safe shut down described above. For example, computer system 3301 can compare a signature with an expected fixed signature. Computer system 500 can further trigger the ARTS system to shut down based on a difference between the signature and the expected fixed signature, according to some embodiments. Computer system 3301 can be any computer capable of performing the functions described herein.

Computer system 3301 can be any well-known computer capable of performing the functions described herein.

Computer system 3301 includes one or more processors (also called central processing units, or CPUs), such as a processor 3304. Processor 3304 is connected to a communication infrastructure or bus 3306.

One or more processors 3304 may each be a graphics processing unit (GPU). In some embodiments, a GPU is a processor that is a specialized electronic circuit designed to process mathematically intensive applications. The GPU may have a parallel structure that is efficient for parallel processing of large blocks of data, such as mathematically intensive data common to computer graphics applications, images, videos, etc.

Computer system 3301 also includes user input/output device(s) 3303, such as monitors, keyboards, pointing devices, etc., that communicate with communication infrastructure 3306 through user input/output interface(s) 3302.

Computer system 3301 also includes a main or primary memory 3308, such as random access memory (RAM). Main memory 3308 may include one or more levels of cache. Main memory 3308 has stored therein control logic (i.e., computer software) and/or data.

Computer system 3301 may also include one or more secondary storage devices or memory 3310. Secondary memory 3310 may include, for example, a hard disk drive 3312 and/or a removable storage device or drive 3314. Removable storage drive 3314 may be a floppy disk drive, a magnetic tape drive, a compact disk drive, an optical storage device, tape backup device, and/or any other storage device/drive.

Removable storage drive 3314 may interact with a removable storage unit 3318. Removable storage unit 3318 includes a computer usable or readable storage device having stored thereon computer software (control logic) and/or data. Removable storage unit 3318 may be a floppy disk, magnetic tape, compact disk, DVD, optical storage disk, and/any other computer data storage device. Removable storage drive 3314 reads from and/or writes to removable storage unit 3318 in a well-known manner.

According to an exemplary embodiment, secondary memory 3310 may include other means, instrumentalities or other approaches for allowing computer programs and/or other instructions and/or data to be accessed by computer system 3301. Such means, instrumentalities or other approaches may include, for example, a removable storage unit 3322 and an interface 3320. Examples of the removable storage unit 3322 and the interface 3320 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 3301 may further include a communication or network interface 3324. Communication interface 3324 enables computer system 3301 to communicate and interact with any combination of remote devices, remote networks, remote entities, etc. (individually and collectively referenced by reference number 3328). For example, communication interface 3324 may allow computer system 3301 to communicate with remote devices 3328 over communications path 3326, which may be wired and/or wireless, and which may include any combination of LANs, WANs, the Internet, etc. Control logic and/or data may be transmitted to and from computer system 3301 via communication path 3326.

In some embodiments, a tangible apparatus or article of manufacture comprising a tangible computer useable or readable medium having control logic (software) stored thereon is also referred to herein as a computer program product or program storage device. This includes, but is not limited to, computer system 3301, main memory 3308, secondary memory 3310, and removable storage units 3318 and 3322, as well as tangible articles of manufacture embodying any combination of the foregoing. Such control logic, when executed by one or more data processing devices (such as computer system 3301), causes such data processing devices to operate as described herein.

Based on the teachings contained in this disclosure, it will be apparent to persons skilled in the relevant art(s) how to make and use embodiments of the invention using data processing devices, computer systems and/or computer architectures other than that shown in FIG. 33. In particular, embodiments may operate with software, hardware, and/or operating system implementations other than those described herein.

CONCLUSION

It is to be appreciated that the Detailed Description section, and not the Summary and Abstract sections (if any), is intended to be used to interpret the claims. The Summary and Abstract sections (if any) may set forth one or more but not all exemplary embodiments of the invention as contemplated by the inventor(s), and thus, are not intended to limit the invention or the appended claims in any way.

While the invention has been described herein with reference to exemplary embodiments for exemplary fields and applications, it should be understood that the invention is not limited thereto. Other embodiments and modifications thereto are possible, and are within the scope and spirit of the invention. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative embodiments may perform functional blocks, steps, operations, methods, etc. using orderings different than those described herein.

References herein to "one embodiment," "an embodiment," "an example embodiment," or similar phrases, indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein.

The breadth and scope of the invention should not be limited by any of the above-described exemplary embodiments, but should be defined only in accordance with the following claims and their equivalents.

What is claimed is:

1. A system for controlling a vehicle, the system comprising:
    a vehicle having an actuation kit, the actuation kit comprising:
        a brake actuator controlled by a brake motor and configured to press and release a brake pedal of the vehicle;
        a throttle actuator controlled by a throttle motor and configured to press and release a gas pedal of the vehicle; and
        a steering actuator configured to control a steering wheel of the vehicle, the steering actuator comprising a steering motor configured to attach to the steering wheel and a reaction stand configured to support the steering motor,
    wherein the system is configured to execute an autonomous movement plan for the vehicle, and
    wherein the system is configured to coordinate movement of the vehicle based on movement of a robotic unit.

2. The system of claim 1, wherein the autonomous movement plan comprises at least one of following a leading vehicle, avoiding a collision with an object, avoiding running into a ditch, merging at an intersection, avoiding a collision while staying in a lane, parking, passing another vehicle, avoiding a collision with a close proximity object, rerouting, following a road, stopping at stop signs or points, making a U-turn, avoiding a collision with an overhanging object, and traversing an open zone.

3. The system of claim 1, wherein the system is configured to execute two or more autonomous movement plans simultaneously.

4. The system of claim 1, wherein the autonomous movement plan comprises a sequence of movement actions.

5. The system of claim 4, wherein the sequence of movement actions comprises at least one of setting a speed of the vehicle, accelerating or decelerating the vehicle at a designated rate, setting a steering angle of the vehicle, setting a brake position of the vehicle, and setting a throttle position.

6. The system of claim 4, wherein the sequence of movement actions comprises at least one of setting the brake pedal according to a specified position or force profile over time with linear interpolation between specified values, setting the gas pedal according to a specified throttle position over time with linear interpolation between specified values, setting the steering wheel according to a specified angle profile over time, setting the steering wheel according to a sinusoidal profile at a designated frequency and designated amplitude, disengagement of brake actuation control, disengagement of throttle actuation control, disengagement of steering actuation control, specifying a delay before moving onto a subsequent movement action in the sequence, advancing to a subsequent movement action in the sequence, completing the autonomous movement plan and stopping the vehicle, steering around a robotic unit, setting a speed of the vehicle relative to a speed of a robotic unit, and specifying an alternate route with positions offset from a robotic unit.

7. The system of claim 4, wherein a movement action of the sequence is triggered based on one or more parameterized conditions.

8. The system of claim 7, wherein the parameterized condition comprises at least one of time to collision, reaching a designated position, reaching a designated speed, reaching a designated acceleration, reaching a designated steering angle of the vehicle, reaching a designated distance to a robotic unit, reaching a designated speed relative to a speed of a robotic unit, completion of a previous movement action in the sequence, reaching of a designated brake actuator position, reaching of a designated throttle actuator position, detection of a sound event, detection of a visible event, detection of a haptic event, and detection of a robot collision event.

9. The system of claim 1, wherein the actuation kit is removable from the vehicle.

10. The system of claim 1, wherein the actuation kit is configured to allow a driver to take over control of the vehicle.

11. The system of claim 1, wherein the robotic unit is configured to autonomously navigate.

12. The system of claim 11, wherein the robotic unit is configured to autonomously navigate according to a defined route.

13. The system of claim 12, wherein the defined route comprises a sequence of positions for the robotic unit to reach.

14. The system of claim 11, wherein the robotic unit comprises sensors, and wherein the robotic unit is configured to navigate using the sensors.

15. The system of claim 1, wherein the movement of e robotic unit is controlled by user input.

16. The system of claim 15, wherein the user input is received wirelessly.

17. The system of claim 1, wherein the system is configured to execute a plurality of autonomous movement plans.

18. The system of claim 17, wherein at least one of the plurality of autonomous movement plans is triggered based on a parameterized condition.

19. The system of claim 17, wherein the system is configured to prioritize one of the plurality of autonomous movement plans over another autonomous movement plan.

20. The system 1, further comprising the robotic unit.

* * * * *

UNITED STATES PATENT AND TRADEMARK OFFICE
CERTIFICATE OF CORRECTION

PATENT NO. : 10,379,007 B2
APPLICATION NO. : 15/192609
DATED : August 13, 2019
INVENTOR(S) : Perrone et al.

Page 1 of 1

It is certified that error appears in the above-identified patent and that said Letters Patent is hereby corrected as shown below:

In the Claims

In Column 36, Claim 15, Line 4, delete "e" and insert --the-- therefor.

In Column 36, Claim 20, Line 16, delete "system 1" and insert --system of claim 1-- therefor.

Signed and Sealed this
Eighteenth Day of February, 2020

Andrei Iancu
*Director of the United States Patent and Trademark Office*